US012487296B2

(12) United States Patent
Le et al.

(10) Patent No.: US 12,487,296 B2
(45) Date of Patent: Dec. 2, 2025

(54) SPIN ORBIT TORQUE BASED THERMAL SENSOR FOR INSITU MONITORING OF MAGNETIC RECORDING HEAD

(71) Applicants: Western Digital Technologies, Inc., San Jose, CA (US); Tokyo Institute of Technology, Tokyo (JP)

(72) Inventors: Quang Le, San Jose, CA (US); Xiaoyong Liu, San Jose, CA (US); Brian R. York, San Jose, CA (US); Cherngye Hwang, San Jose, CA (US); Rohan Babu Nagabhirava, Virginia Beach, VA (US); Kuok San Ho, Emerald Hills, CA (US); Hisashi Takano, Fujisawa (JP); Son T. Le, San Jose, CA (US); Nam Hai Pham, Tokyo (JP); Huy H. Ho, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 117 days.

(21) Appl. No.: 18/350,584

(22) Filed: Jul. 11, 2023

(65) Prior Publication Data
US 2024/0310459 A1   Sep. 19, 2024

Related U.S. Application Data

(60) Provisional application No. 63/451,708, filed on Mar. 13, 2023.

(51) Int. Cl.
*G01R 33/07* (2006.01)
*G01R 33/00* (2006.01)
*G01R 33/09* (2006.01)

(52) U.S. Cl.
CPC ....... *G01R 33/075* (2013.01); *G01R 33/0052* (2013.01); *G01R 33/093* (2013.01)

(58) Field of Classification Search
CPC . G01R 33/075; G01R 33/0052; G01R 33/093
See application file for complete search history.

(56) References Cited

U.S. PATENT DOCUMENTS 8,604,571 B2   12/2013 Uchida et al.
2014/0268386 A1  9/2014 Li et al.
(Continued)

FOREIGN PATENT DOCUMENTS

JP          5-807483 B2    11/2015

*Primary Examiner* — Alvaro E Fortich
(74) *Attorney, Agent, or Firm* — Patterson + Sheridan, LLP

(57) ABSTRACT

The present disclosure generally relates to temperature detection devices including a ferromagnetic (FM) material disposed at a media facing surface (MFS). The FM material is configured to produce a first electric voltage signal in response to a temperature gradient due to an anomalous Nernst effect. The temperature detection device may also include a spin-orbit torque (SOT) material abutting the FM material. The SOT material includes at least one of BiSb, a topological insulator, a topological half-Heusler alloy, or a weakly oxidized heavy metal. The SOT material is recessed from the MFS, wherein the SOT material is configured to receive a spin current parallel to the temperature gradient generated by a spin Seebeck effect in the FM material. The spin current is detectable as a second electric voltage signal via an inverse spin Hall effect. The first electric voltage signal is added to the second electric voltage signal.

25 Claims, 12 Drawing Sheets

(56) References Cited

U.S. PATENT DOCUMENTS

| | | |
|---|---|---|
| 2016/0155919 A1 | 6/2016 | Kinoshita et al. |
| 2018/0106873 A1* | 4/2018 | Wu .................... G01R 33/093 |
| 2020/0037884 A1 | 2/2020 | Ishida et al. |
| 2020/0176022 A1* | 6/2020 | Li ........................... G11B 5/21 |
| 2020/0279992 A1* | 9/2020 | Pham .................... H10N 50/85 |
| 2020/0335682 A1* | 10/2020 | Kirihara ................ H10N 15/00 |
| 2023/0063084 A1* | 3/2023 | Pham .................... H10N 52/00 |

* cited by examiner

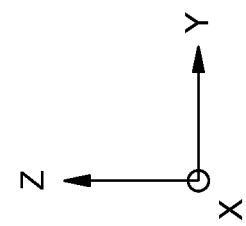

SPIN ORBIT TORQUE BASED THERMAL SENSOR FOR INSITU MONITORING OF MAGNETIC RECORDING HEAD

CROSS-REFERENCE TO RELATED APPLICATIONS

This application claims benefit of U.S. Provisional Patent Application Ser. No. 63/451,708, filed Mar. 13, 2023, which is herein incorporated by reference.

BACKGROUND OF THE DISCLOSURE

Field of the Disclosure

Embodiments of the present disclosure generally relate to a spin-orbit torque (SOT) layered device for measuring temperature based on one or more of the anomalous Nernst effect, the spin Seebeck effect, and the inverse spin Hall effect.

Description of the Related Art

At the heart of a computer is a magnetic disk drive. Information is written to and read from a disk as it rotates past read and write heads that are positioned very closely to the magnetic surface of the disk. Fly-height is the spacing between the read and write heads and the recording disk. A key variable in fly-height is the read/write element protrusion towards the recording disk. When data is written to the disk, a high frequency electrical current is applied to the head's write coil. With the applied write current, the write element heats up and expands, generating additional protrusion of the read/write element region of the head towards the disk. This thermally-driven protrusion phenomena reduces the accurate spacing control between the read/write elements on the head and may result in destructive head/disk interactions. Furthermore, in various forms of energy assisted magnetic recording such as heat assisted magnetic recording (HAMR) and microwave assisted magnetic recording (MAMR), the injection of the assistive energy to aid recording can also cause head expansion and protrusion toward the disk. Additionally, the fly-height may be controlled by a controlled heating element called a thermal fly-height control (TFC) to intentionally induce expansion of the recording head to reduce the spacing between the head and disk.

As demand for higher capacity storage devices continues to increase, issues regarding thermal fly-height control (TFC) efficiency and head protrusion in hard disk drive (HDD) recording head environments become more important. Since head temperature monitoring is critical to both, there is a need for an improved temperature detection device.

SUMMARY OF THE DISCLOSURE

The present disclosure generally relates to temperature detection devices including a ferromagnetic (FM) material disposed at a media facing surface (MFS). The FM material is configured to produce a first electric voltage signal in response to a temperature gradient due to an anomalous Nernst effect. The temperature detection device may also include a spin-orbit torque (SOT) material abutting the FM material. The SOT material includes at least one of Bismuth Antimony (BiSb), a topological insulator, a topological half-Heusler alloy, or a weakly oxidized heavy metal. The SOT material is recessed from the MFS, where a spin current parallel to the temperature gradient is injected into SOT material via a spin Seebeck effect. The spin current is detectable as a second electric voltage signal via an inverse spin Hall effect. The first electric voltage signal is added to the second electric voltage signal.

In one embodiment, a temperature detection device, comprising a ferromagnetic (FM) material disposed at a media facing surface (MFS). The FM material is configured to produce a first electric voltage signal in response to a temperature gradient due to an anomalous Nernst effect. The temperature detection device also comprises a spin-orbit torque (SOT) material abutting the FM material. The SOT material comprises at least one of BiSb, a topological insulator, a topological half-Heusler alloy, or a weakly oxidized heavy metal. The SOT material is recessed from the MFS, wherein the SOT material is configured to receive a spin current parallel to the temperature gradient generated by a spin Seebeck effect in the FM materials. The spin current being detectable as a second electric voltage signal via an inverse spin Hall effect. The first electric voltage signal is added to the second electric voltage signal.

In another embodiment, a magnetic recording head comprising a read head and a temperature detection device disposed adjacent to the read head. The temperature detection device comprising a ferromagnetic (FM) material disposed at a media facing surface (MFS). The FM material has a magnetization direction parallel to the MFS. A temperature gradient of the FM material is perpendicular to the MFS, wherein the FM material is configured to generate an electric voltage signal in response to a temperature gradient due to an anomalous Nernst effect.

In yet another embodiment, a temperature detection device, comprising a ferromagnetic (FM) material disposed at a media facing surface (MFS). The FM material has a magnetization direction parallel to the MFS. The temperature detection device further comprises a spin-orbit torque (SOT) material comprising a body portion and an overhang portion. The overhang portion is stacked on the FM material, and the body portion abuts the FM material and is recessed from the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C illustrate SOT material layer portions, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
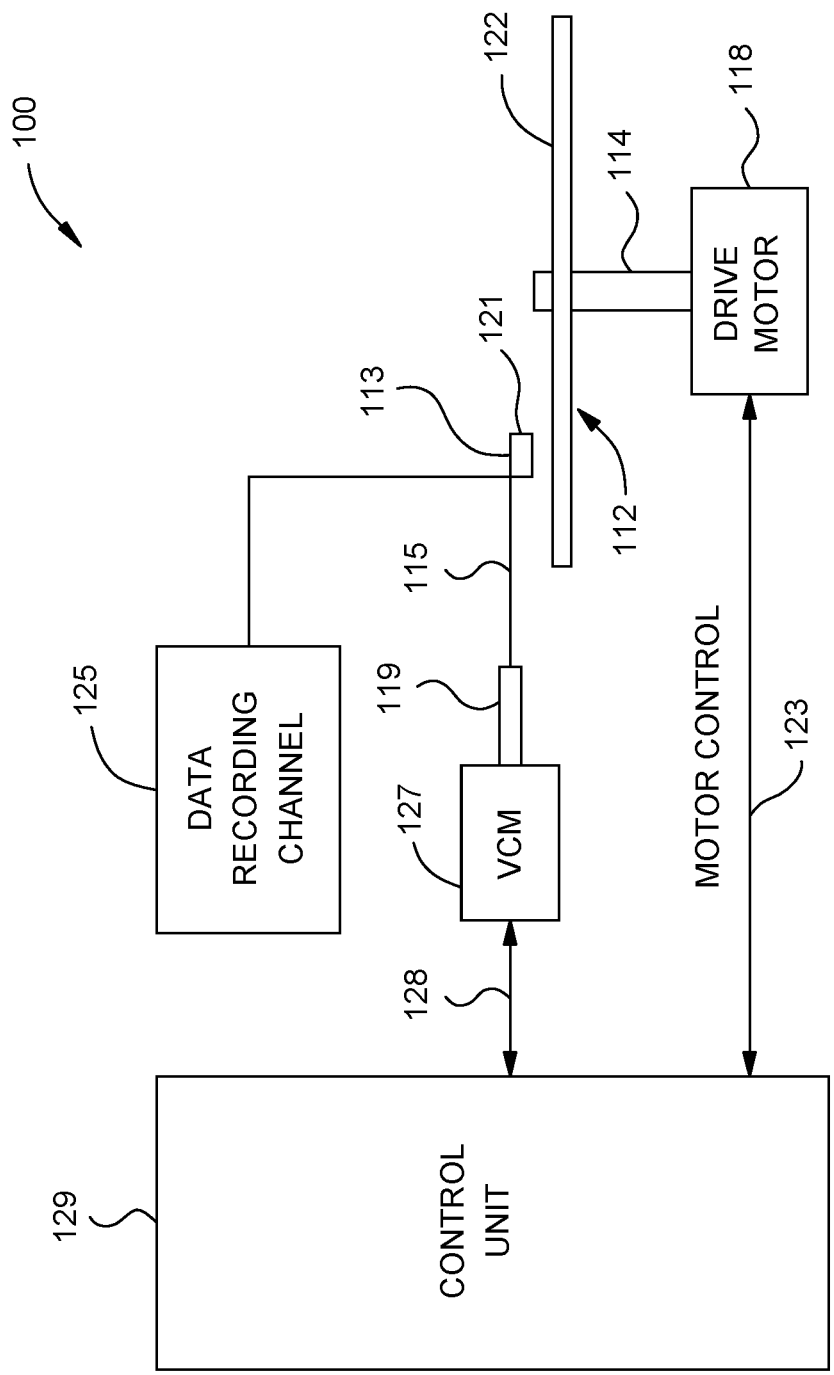
FIG. 1 is a schematic illustration of certain embodiments of a magnetic media drive.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to temperature detection devices including a ferromagnetic (FM) material disposed at a media facing surface (MFS). The FM material is configured to produce a first electric voltage signal in response to a temperature gradient due to an anomalous Nernst effect. The temperature detection device may also include a spin-orbit torque (SOT) material abutting the FM material. The SOT material includes at least one of BiSb, a topological insulator, a topological half-Heusler alloy, or a weakly oxidized heavy metal. The SOT material is recessed from the MFS, wherein the SOT material received a spin current from the FM layer with the direction parallel to the temperature gradient via a spin Seebeck effect. The spin current is detectable as a second electric voltage signal via an inverse spin Hall effect. The first electric voltage signal is added to the second electric voltage signal.

In one embodiment, a temperature detection device may be utilized in a magnetic media disk drive 100, e.g., as part of the recording head. Conventionally, an embedded contact sensor (ECS), a resistive based device, is used as part of a critical function of head flying height and head-media contact regulation. One example implementation is described in co-owned U.S. Pat. No. 8,873,191B2, "Fly-height control and touchdown detection," issued Oct. 28, 2014, the disclosure of which is hereby incorporated by reference. The resistance of ECS can be changed by the air bearing cooling and frictional induced heat caused by head-disk contact at the head disk interface. Such resistance can be measured and used by the controller of the magnetic recording device to regulate flying height of the recording head.

The temperature detection device as described herein may be used in lieu of the ECS. Placed at or near the media facing surface (MFS) of the recording head, the temperature detection device can similarly detect the temperature changes caused by the air bearing cooling and frictional induced heat caused by head-media contact at the head disk interface. The temperature detection device in various embodiments includes spin orbit torque materials, and uses the spin Seebeck effect and the associated inverse spin Hall effect to generate a voltage signal output that can be used by the drive controller to regulate recording head flying height and media contact.

Besides fly height and contact regulation, the temperature detection device may also be used to monitor temperature in the recording head. In particular, in various forms of energy assisted magnetic recording such as HAMR and MAMR, the injection of the assistive energy to aid recording can cause heating effects throughout the recording head, and the temperature detection device may be placed, for example, near the writer or an energy generating component such as the near field transducer (NFT) in HAMR to monitor temperature for reliability enhancements.

FIG. 1 is a schematic illustration of certain embodiments of a magnetic media disk drive 100. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that include a SOT-based temperature detection device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on the magnetic disk 112. Write and read signals are communicated to and from write and read heads on the magnetic head assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders. It is to be understood that the embodiments discussed herein are applicable to a data storage device such as a hard disk drive (HDD) as well as a tape drive, such as those conforming to the LTO (Linear Tape Open) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
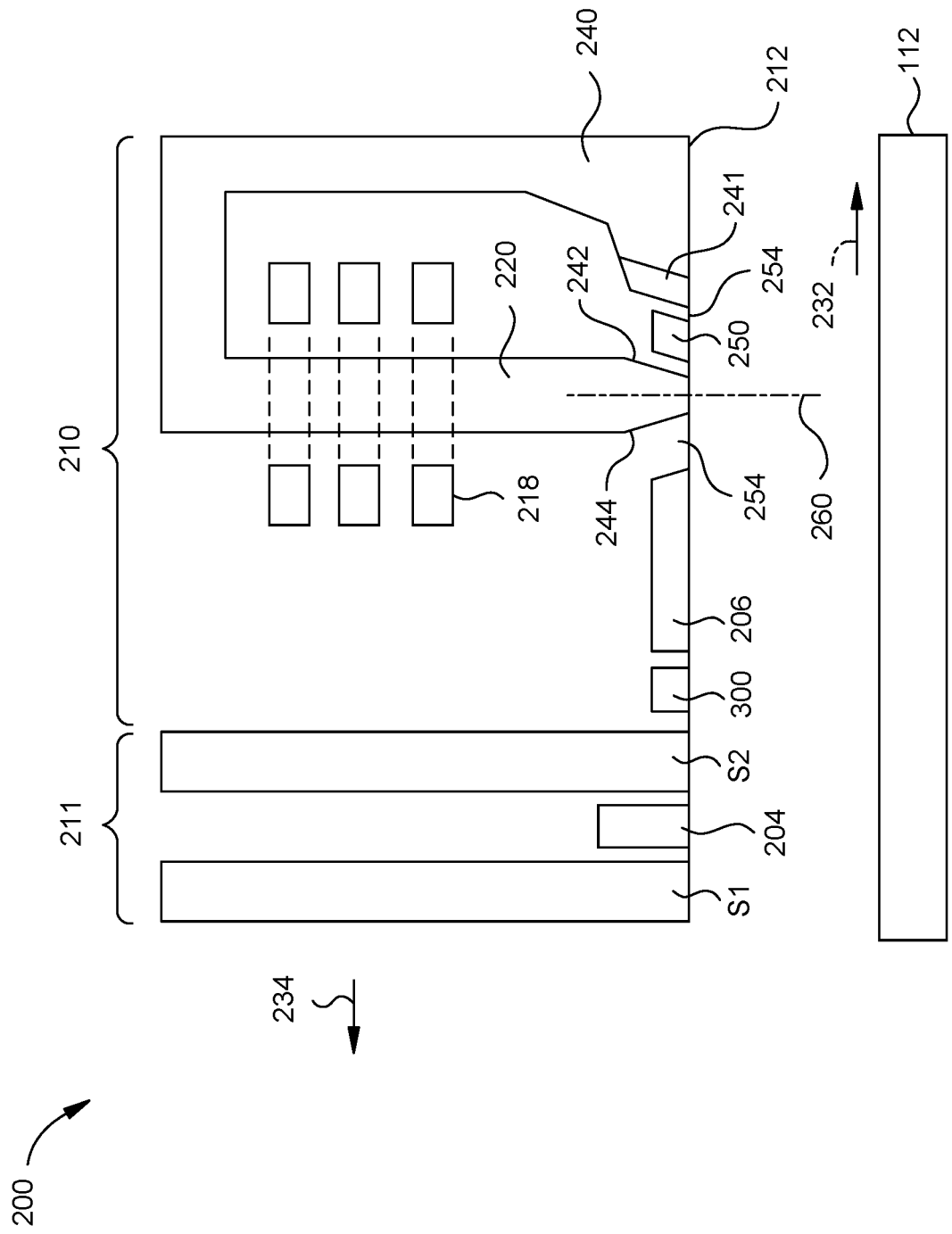
FIG. 2 is a fragmented, cross-sectional side view of certain embodiments of a read/write head having a SOT temperature detection device.

FIG. 2 is a fragmented, cross-sectional side view of certain embodiments of a read/write head 200 having a SOT device. It is noted while an SOT device is shown in both the read head and write head, this is for illustrative purposes only, and an SOT device may be independently integrated into either only the read head or only the write head in various embodiments, or in both the read head and the write head. The read/write head 200 faces a magnetic disk 112. The read/write head 200 may correspond to the magnetic head assembly 121 described in FIG. 1. The read/write head 200 includes a media facing surface (MFS) 212, such as a gas bearing surface, facing the magnetic disk 112, a write head 210, and a magnetic read head 211. As shown in FIG. 2, the magnetic disk 112 moves past the write head 210 in the direction indicated by the arrow 232 and the read/write head 200 moves in the direction indicated by the arrow 234.

In some embodiments, the magnetic read head 211 is a SOT read head that includes an SOT sensing element 204 located between SOT shields S1 and S2. The magnetic fields of the adjacent magnetized regions in the magnetic disk 112 are detectable by the SOT sensing element 204 as the recorded bits. In other embodiments, the magnetic read head 211 includes a magneto-resistive (MR) type sensing element 204 located between the two shields S1 and S2.

The write head 210 includes a main pole 220, a leading shield 206, a trailing shield 240, and a coil 218 that excites the main pole 220. The coil 218 may have a "pancake" structure which winds around a back-contact between the main pole 220 and the trailing shield 240, instead of a "helical" structure shown in FIG. 2. In one embodiment, the write head 210 is a perpendicular magnetic recording (PMR) write head. In other embodiments, the write head 210 may use energy assisted magnetic recording (EAMR) technologies such as microwave assisted magnetic recording (MAMR) and heat assisted magnetic recording (HAMR).

In FIG. 2, a spin orbital torque (SOT) device 250 is shown as part of the write head structure to enable a MAMR recording effect, in one embodiment. As noted above, while an SOT device is shown in FIG. 2 for both the read head and the write head, the SOT devices are not required to be implemented in both. The SOT device 250 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer 241. The trailing shield hot seed layer 241 can include a high moment sputter material, such as CoFe, CoFeNi, or FeXN, where X includes at least one of Rh, Al, Ta, Zr, Co, and Ti. In certain embodiments, the trailing shield 240 does not include a trailing shield hot seed layer.

In some embodiments, the read head 211 is a spin torque oscillator (STO) read head with an STO sensing element 204 located between shields S1 and S2. The magnetic fields of the adjacent magnetized regions in the magnetic disk 112 are detectable by the STO sensing element 204 as the recorded bits. The STO reader may be operated in a 2-terminal or a 3-terminal configuration, with an in-plane current flowing inside SOT structure while a small sensing current flows perpendicular to the film plane, and the signal is read out by measuring the frequency of magnetic layer precession. The SOT device of various embodiments can be incorporated into the read head 211.

A temperature detection device 300 may be located close to the magnetic read head 211. The temperature detection device 300 may be located at the edge of the MFS 212. In some embodiments, the temperature detection device 300 is located closer to the read head 211 than to the write head 210. The temperature detection device 300 may be located below S1 or above S2, in the down-track direction (above S2 shown in figure). In other embodiments, the temperature detection device 300 is located closer to the write head 210 than to the magnetic read head 211. The temperature detection device 300 may be located between the leading shield 206 and S2, or between the leading shield 206 and the main pole 220. In some embodiments, the temperature detection device 300 may be located about 50 nm (nanometer) to about 500 nm from S2 of the read head 211 or below S1 of the read head 211. In other embodiments, the temperature detection device 300 may be located about 50 nm to about 500 nm from the write head 210.

In other embodiments, the temperature detection device 300 may be, but is not limited to, uncool infrared/terahertz cameras for smart phones or security. In some embodiments, when the temperature detection device 300 is utilized for infrared applications, an absorber (not shown) that is on the outside of the temperature detection device may be vanadium oxide or amorphous silicon. In some embodiments, when the temperature detection device 300 is utilized for terahertz applications, the absorber may be layers of carbon nanotubes.

Figure 3A:
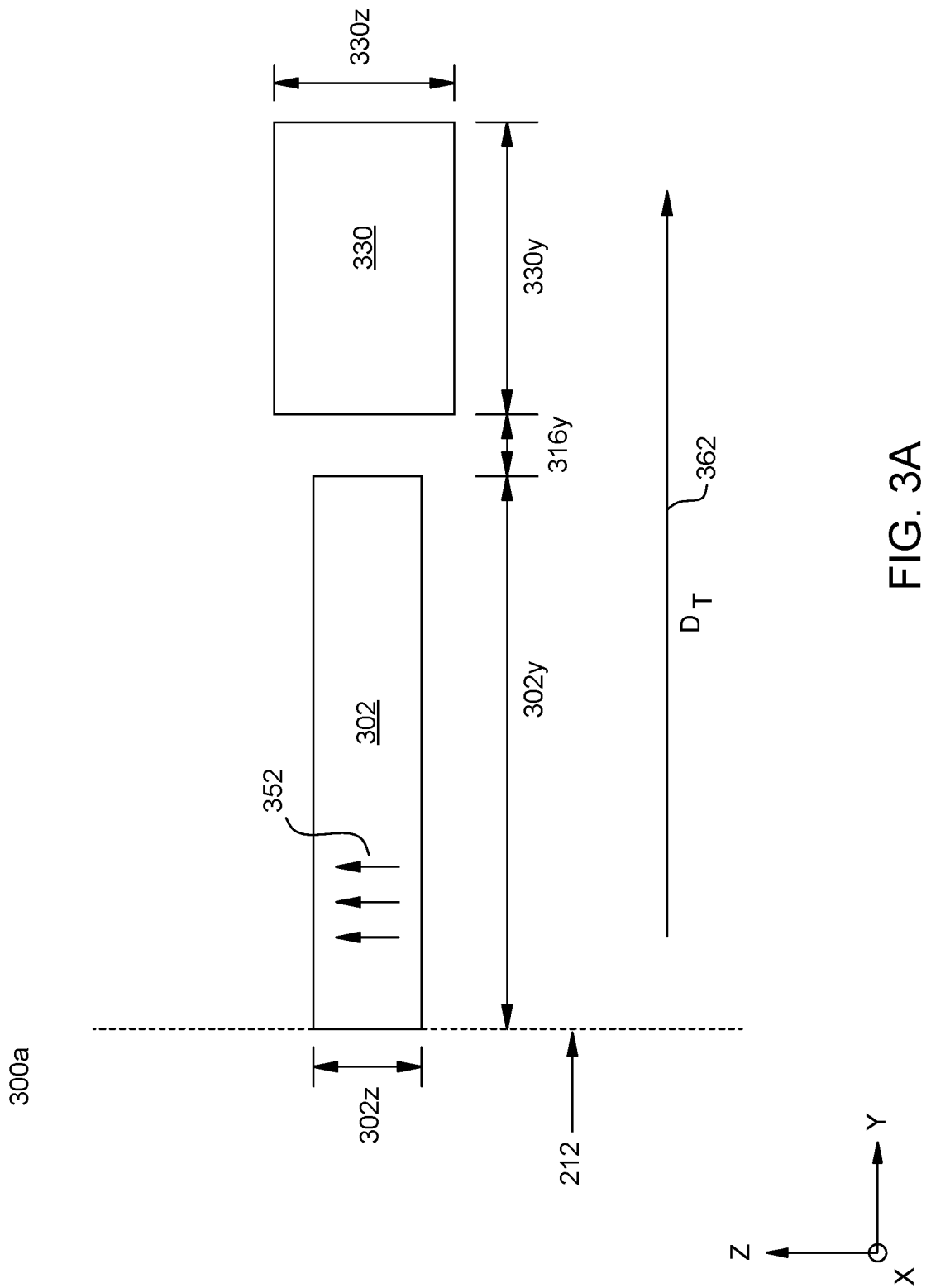
FIGS. 3A-3H illustrate views of SOT temperature detection devices, according to various embodiments.
Figure 3B:
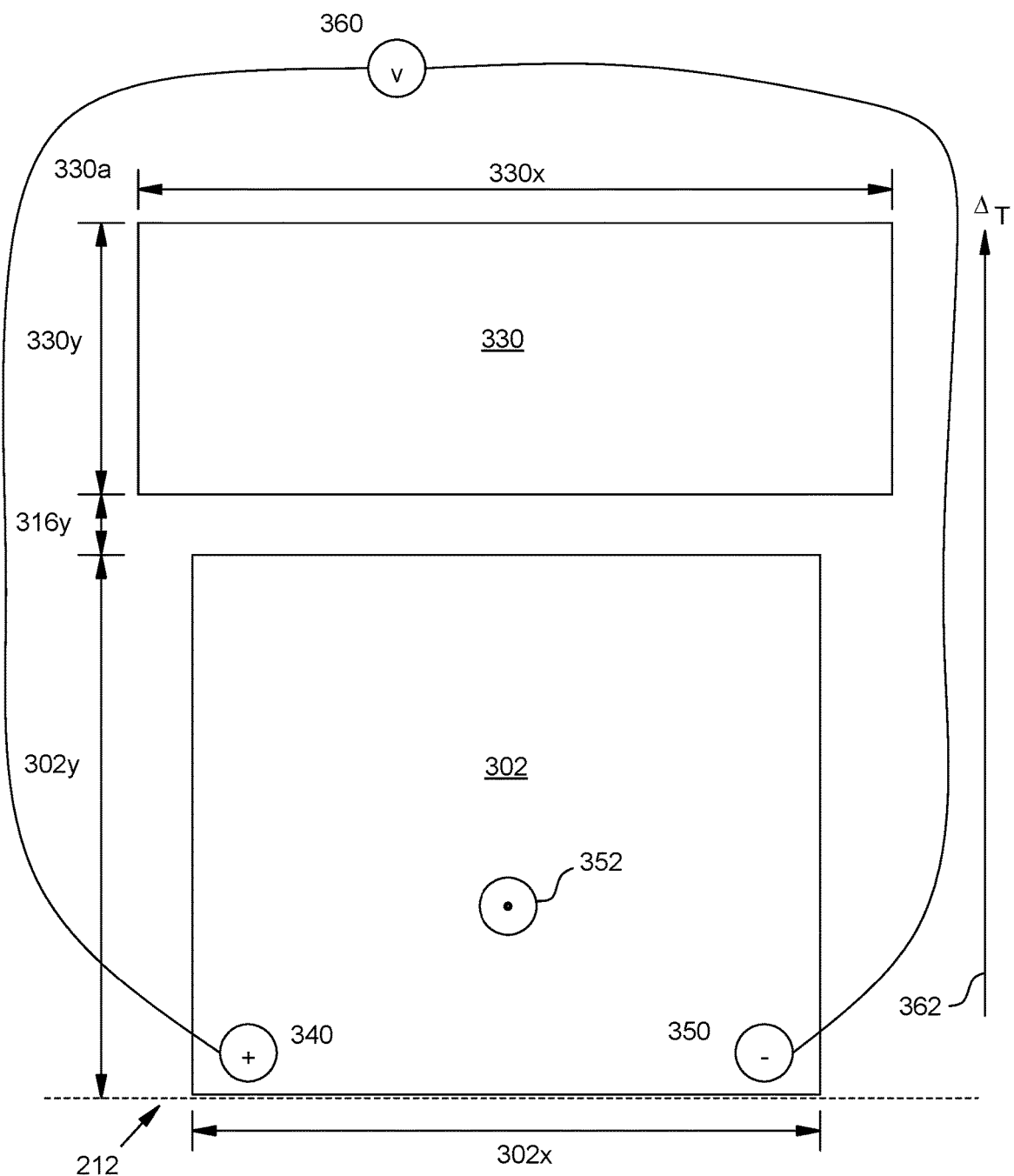
Figure 3C:
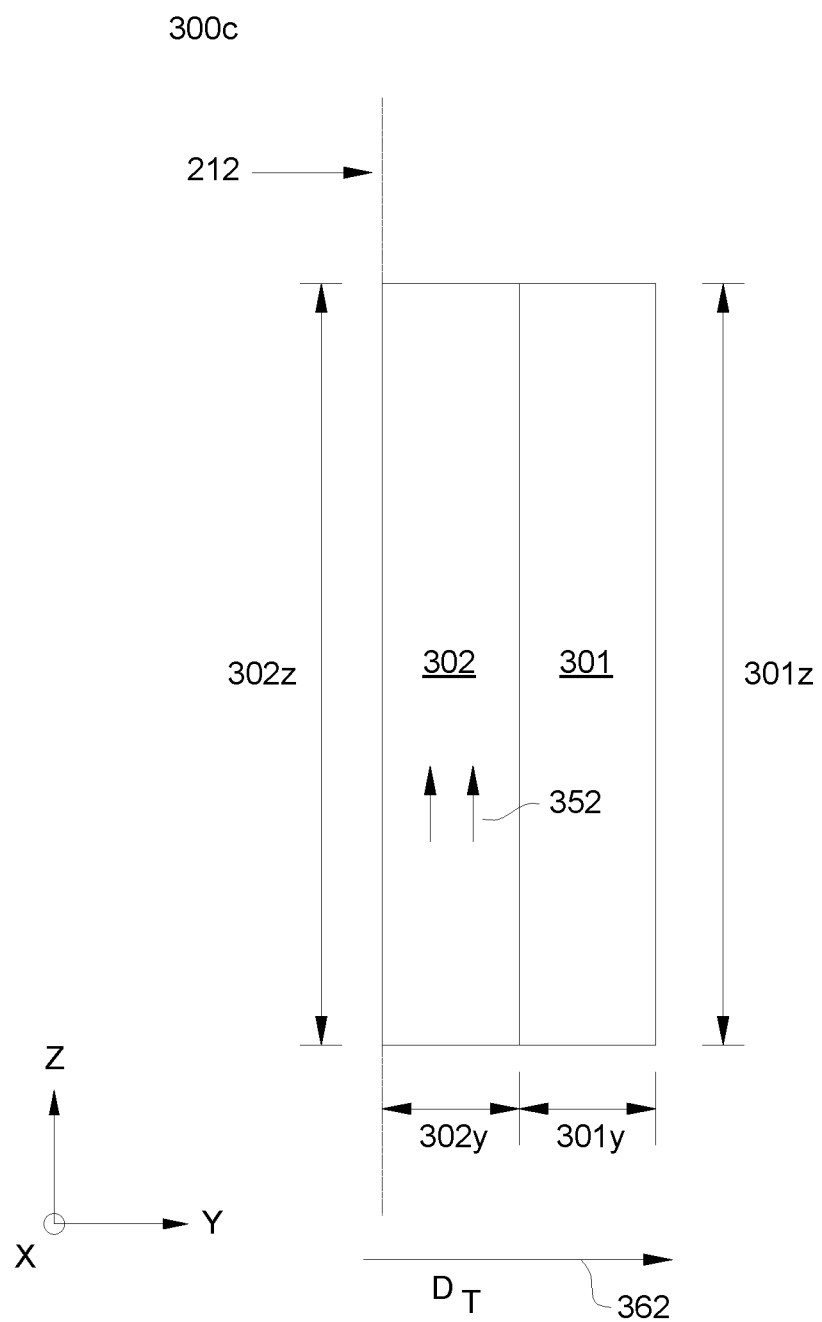
Figure 3D:
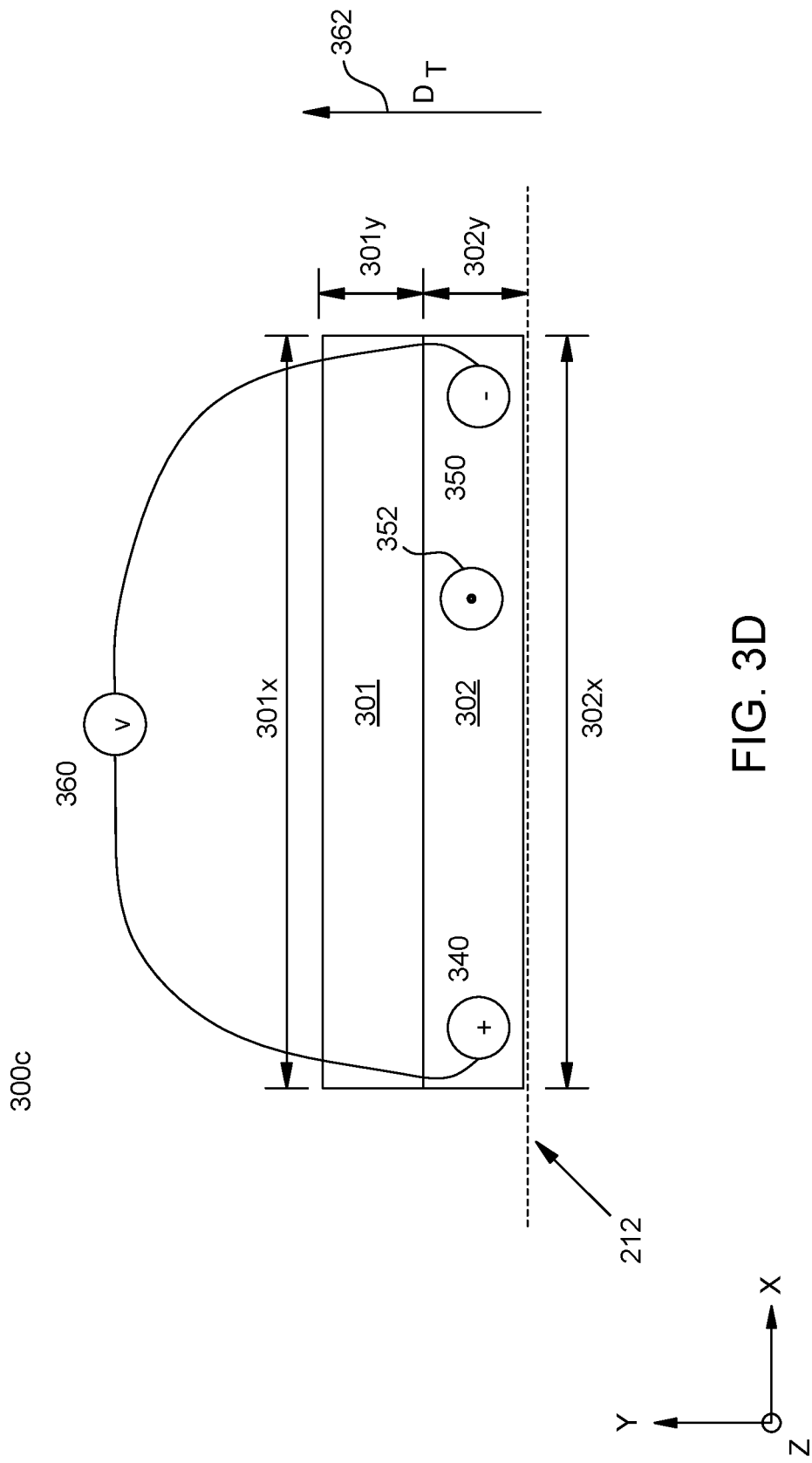
Figure 3E:
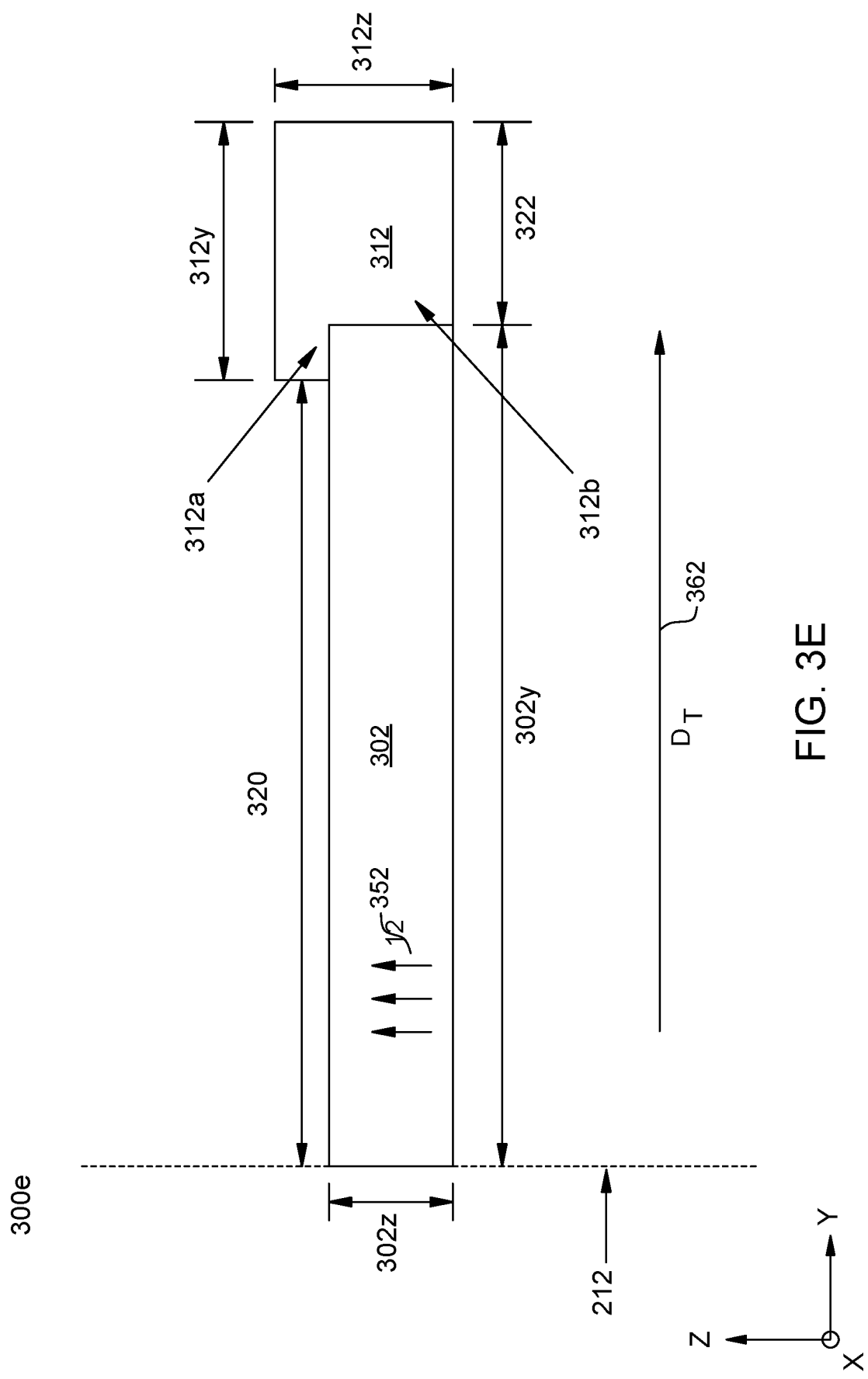
Figure 3F:
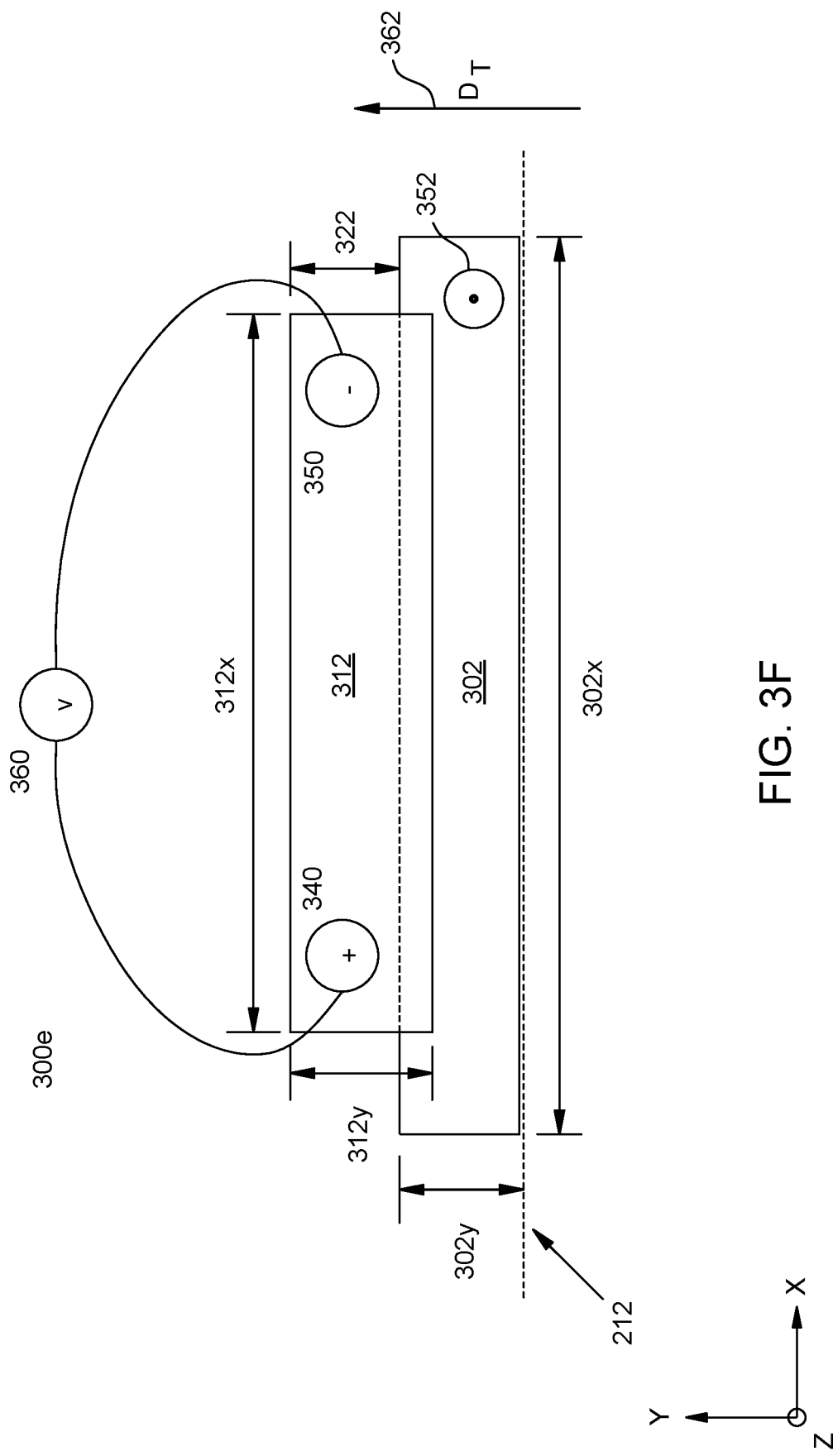
Figure 3G:
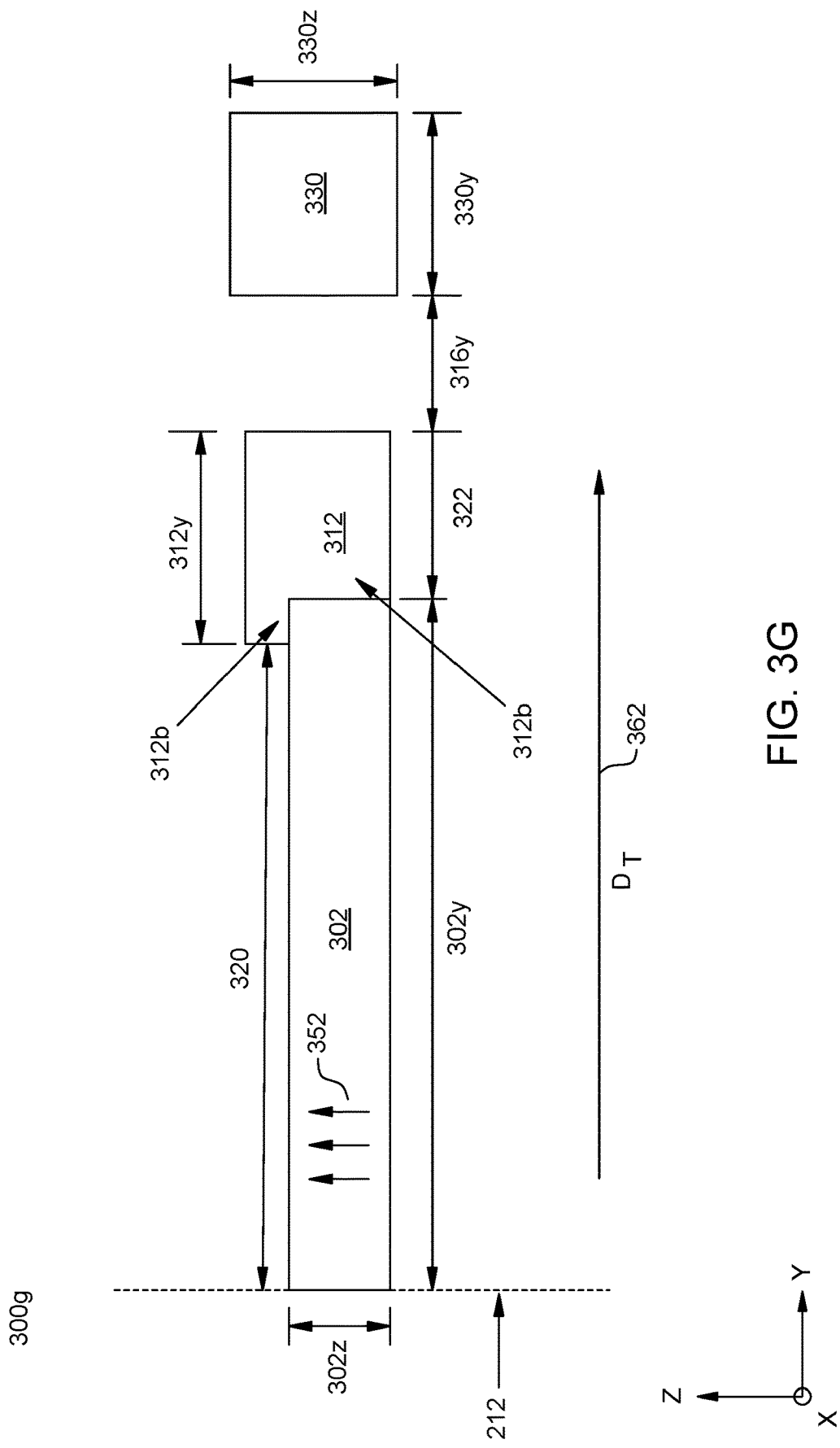
Figure 3H:
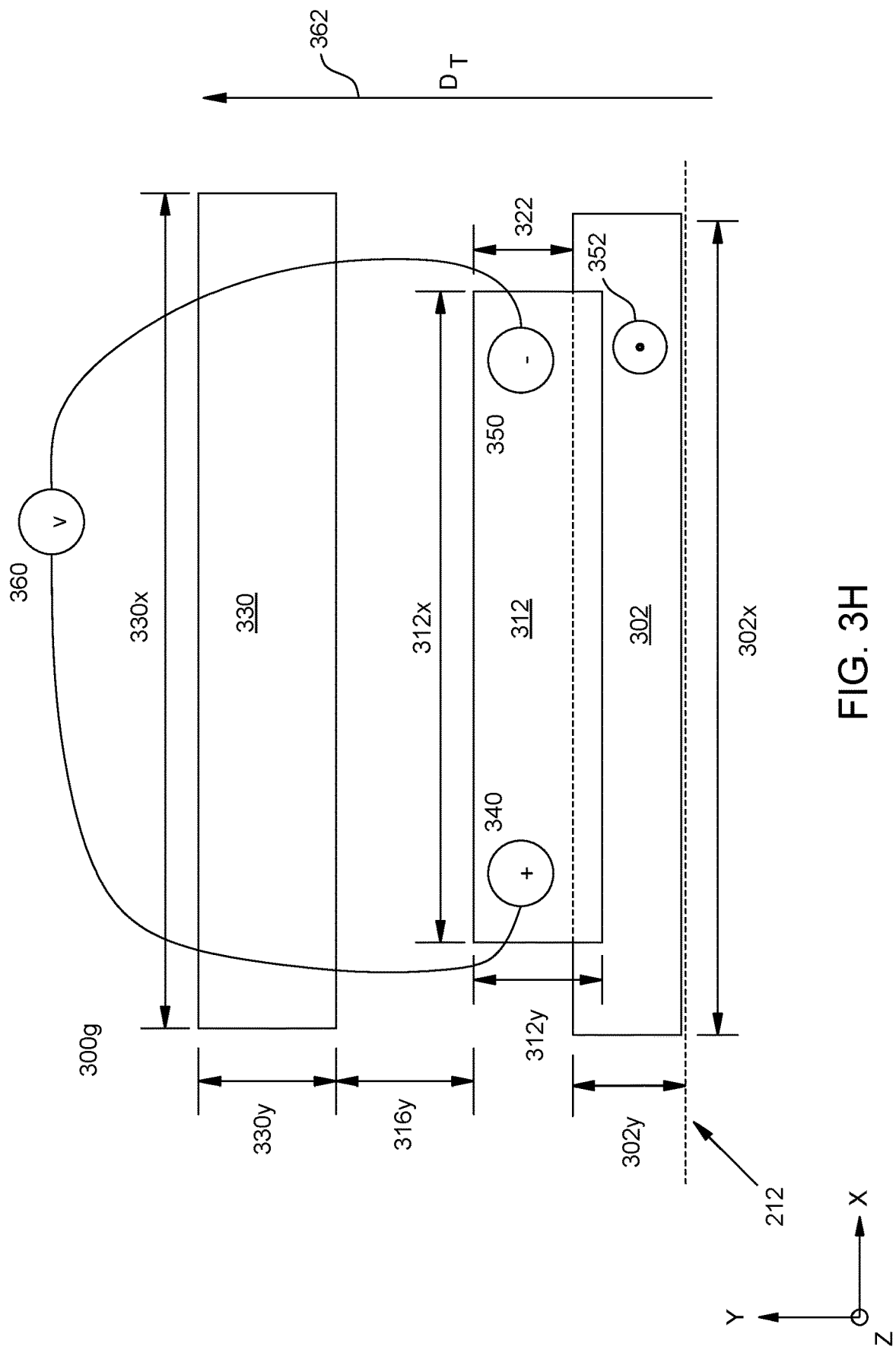

FIGS. 3A-3H illustrate temperature detection device 300a, 300c, 300e, 300g (collectively referred to herein as temperature detection devices 300), according to various embodiments. FIG. 3A, FIG. 3C, FIG. 3E, and FIG. 3G are APEX views of the temperature detection devices 300. FIG. 3B, FIG. 3D, FIG. 3F, and FIG. 3H illustrate top views of the temperature detection devices 300. FIGS. 3A and 3B illustrate the temperature detection device 300a, FIGS. 3C and 3D illustrate the temperature detection device 300c, FIGS. 3E and 3F illustrate the temperature detection device 300e, and FIGS. 3G and 3H illustrate the temperature detection device 300g. Each of the temperature detection devices 300 may individually be the temperature detection device 300 of FIG. 2, and may each individually be utilized within the magnetic media disk drive 100 of FIG. 1. In other embodiments, the temperature detection device 300 may be used outside of a magnetic recording device, in which case the considerations on the relative placement of the layers of the temperature detection devices 300 with respect to a media facing surface may not be applicable.

In one embodiment, as shown in FIGS. 3A and 3B, the temperature detection device 300a comprises a ferromagnetic (FM) material 302, which is adjacent to or disposed at an MFS 212, and a heat sink 330 recessed from the MFS 212. The FM material 302 exhibits perpendicular magnetic anisotropy (PMA) where the magnetization direction 352 is perpendicular to film plane (x-y plane) and parallel to the MFS 212 (e.g., in the z-direction). The FM material 302 has dimensions of a width 302x measured in the x-direction, a thickness 302z measured in the z-direction, and a height 302y measured in the y-direction. In some embodiments, the FM material width 302x may range from 100 nm to 100 µm. The FM material thickness 302z may range from 1 nm to 100 nm. The FM material height 302y may range from 50 nm to 1 µm. In one embodiment, as shown in FIGS. 3A and 3B, the FM material width 302x and the FM material height 302y are larger than the FM material thickness 302z. It is noted in this series of figures, the X-Y-Z axis orientation is based on the temperature device 300's build orientation. Relative to the overall recording head, X-axis is the cross-track direction, Y-axis is the throat height direction and Z-axis is the down-track direction.

In FIGS. 3A-3H, a temperature gradient 362 exists along the y-direction due to TFC heating and proximity of the head to the media. Without being limited by theory, due to the anomalous Nernst effect, a voltage signal due to the temperature gradient 362 is generated, which is proportional to the vector product of magnetization (along the z-direction) and temperature gradient 362 (along the y-direction). This voltage signal is maximized if measured in the cross track direction (along the x-direction). The signal Vx can be calculated using the following equation:

$$V_x = \frac{S_{xz} w \Delta T}{h}$$

In the above equation, w is the width 302x of the FM material 302, $S_{xz}$ is the anomalous Nernst coefficient and is in the range of approximately 0.5 to 5 ρV/K for magnetic materials, ΔT is the difference in temperature along the y-direction of the FM material 302, and h is the height 302y of the FM material 302. As an example, when w is about 100 µm and h is about 100 nm, the signal is approximately 0.5 to 5 mv/K.

Although exemplified in FIGS. 3A and 3B, the following may be applied to any of the temperature detection devices 300a, 300c, 300e of FIGS. 3A-3H. As shown in FIGS. 3A and 3B, a gap is present between the FM material 302 and the heat sink 330. In other embodiments, the heat sink 330 may be in contact with the FM material 302. In other embodiments, the heat sink 330 may be separated from the FM material 302 by insulating material. The heat sink 330 increases the thermal gradient, thus increasing the output voltage. Thus, a heat sink 330 may be utilized to make the temperature gradient 362 easier to measure. Without being limited by theory, a gap or insulating material may be located between the heat sink 330 and the FM material 302 to prevent signal migration into the heat sink 330. Alternatively, the temperature detection device 300 may not include a heat sink 330 (similar to FIGS. 3C-3F).

The heat sink 330 has dimensions of a width 330x measured in the x-direction, a thickness 330z measured in the z-direction, and a height 330y measured in the y-direction. In some embodiments, the heat sink width 330x may range from 200 nm to 100 µm. The heat sink thickness 330z may range from 50 nm to 2 µm. The heat sink height 330y may range from 100 nm to 500 nm. In some embodiments, the heat sink 330 may have a width 330x that is greater than or equal to the width 302x of the FM material 302. The heat sink 330 may have a thickness 330z that is greater than or equal to than the thickness 302z of the FM material 302. The heat sink 330 may have a height 330y that is greater than, equal to, or less than the height 302y of the FM material 302. The gap height 316y between the FM material 302 and the heat sink 330 may range from 300 nm to 100 µm.

FIG. 3B illustrates the layout of a voltage meter 360 in combination with the temperature detection device 300a. The FM material 302 has a positive terminal 340 and a negative terminal 350, which are both connected to the voltage meter 360. The voltage read at the voltage meter 360 corresponds to the temperature gradient 362 along the FM material 302 due to the anomalous Nernst effect.

FIGS. 3C and 3D illustrate another embodiment of the present disclosure. Similar to FIGS. 3A and 3B, in FIGS. 3C and 3D, the temperature detection device 300c comprises the FM material 302, which is adjacent to or disposed at the MFS 212. However, it is noted for the specific embodiment in FIGS. 3C and 3D, width is measured in the x direction, height is measured in the z direction, and thickness is measured in the y direction. The FM material 302 has a magnetization direction 352 parallel to the MFS 212 (e.g., in the z-direction). The temperature detection device 300c additionally comprises an antiferromagnetic (AFM) material 301. In FIG. 3C, the AFM material 301 is disposed adjacent the FM material 302, recessed from the MFS 212. In FIGS. 3C and 3D, the FM material width 302x and the FM material height 302z are larger than the FM material thickness 302y. Without being limited by theory, the AFM material(s) 301 may be utilized to pin the FM magnetization along direction 352.

The AFM material 301 has dimensions of a width 301x measured in the x-direction, a height 301z measured in the z-direction, and a thickness 301y measured in the y-direction. In some embodiments, the AFM material width 301x may range from 100 nm to 100 µm. The AFM material height 301z may range from 50 nm to 1 µm. The AFM material thickness 301y may range from 5 nm to 10 nm. In some embodiments, the AFM material 301 may have a width 301x that is greater than or equal to the width 302x of the FM material 302. The AFM material 301 may have a thickness 301y that is greater than, equal to, or less than the thickness 302y of the FM material 302. The AFM material 301 may have a height 301z that is greater than or equal to the height 302z of the FM material 302. In one embodiment, the AFM material 301 has approximately the same width 301x as the FM material width 302x and approximately the same height 301z as the FM material height 302z.

FIG. 3D illustrates the layout of a voltage meter 360 in combination with the temperature detection device 300c. The FM material 302 has a positive terminal 340 and a negative terminal 350, which are both connected to the voltage meter 360. The voltage read at the voltage meter 360 corresponds to the temperature gradient 362 along the FM material 302 due to the anomalous Nernst effect.

FIGS. 3E and 3F illustrate yet another embodiment of the present disclosure. In FIGS. 3E and 3F, similar to FIGS. 3A-3D, the temperature detection device 300e comprises the FM material 302, which is adjacent to or disposed at the MFS 212. The FM material 302 has a magnetization direction 352 parallel to the MFS 212 (e.g., in the z-direction). The temperature detection device 300e further comprises an SOT material 312 disposed adjacent to the FM material 302 and recessed from the MFS 212. The SOT material 312 is spaced a distance 320 of about 50 nm to 1 µm (micrometer) away from the MFS 212. As shown in FIGS. 3E and 3F, the SOT material comprises an overhang portion and a body portion. In some embodiments, the overhang portion is zero to 5-10 nm. The SOT material 312 has a width 312x in the x-direction and a thickness 312z in the z-direction. The overhang portion 312a of the SOT material 312 has a height 312y in the y-direction and the body portion 312b has a height 322 in the y-direction. In FIGS. 3E and 3F, the SOT material overhang portion height 312y is greater than the SOT material bottom surface height 322 such that the overhang portion height 312y overlaps a portion of the FM material 302, like shown in FIG. 3F. In other embodiments, the SOT material overhang portion height 312y is equal to the SOT material bottom surface height 322 such that there is no portion of the SOT material 312 on the FM material 302. The SOT material 312 may overlap the FM material 302 up to about 5 nm to 10 nm. The FM material 302 may have the same dimension as discussed above as the temperature detection device 300a and/or 300e. In some embodiments, the SOT material width 312x may range from 100 nm to 100 µm. The SOT material thickness 312z may range from 5 nm to 50 nm. The SOT material overhang portion height 312y may range from the same value as the SOT material bottom surface height 322 to about 5 nm to 10 nm greater the SOT material bottom surface height 322. The SOT material bottom surface height 322 may range from 20 nm to 50 nm.

FIG. 3F illustrates the layout of a voltage meter 360 in combination with the temperature detection device 300e. The SOT material 312 has a positive terminal 340 and a negative terminal 350, which are both connected to the voltage meter 360. The voltage read at the voltage meter 360 corresponds to the temperature gradient 362 along the FM material 302 and the SOT material 312, due to the anomalous Nernst effect, the spin Seebeck effect, and the inverse spin Hall effect.

FIGS. 3G and 3H illustrate yet another embodiment of the present disclosure. In FIGS. 3G and 3H, similar to FIGS. 3E and 3F, the temperature detection device 300g comprises the FM material 302, which is adjacent to or disposed at the MFS 212, and the SOT material 312 recessed from the MFS 212. Like described above, the SOT material 312 overlaps a portion of the FM material 302. The FM material 302 has a magnetization direction 352 parallel to the MFS 212 (e.g., in the z-direction). The SOT material 312 is spaced a distance 320 away from the MFS 212. The temperature detection device 300g further includes a gap between the SOT material 312 and the heat sink 330.

FIG. 3H illustrates the layout of a voltage meter 360 in combination with the temperature detection device 300g. The SOT material 312 has a positive terminal 340 and a negative terminal 350, which are both connected to the voltage meter 360. The voltage read at the voltage meter 360 corresponds to the temperature gradient 362 along the FM material 302 and the SOT material 312, due to the anomalous Nernst effect, the spin Seebeck effect, and the inverse spin Hall effect.

In FIGS. 3E-3G, a temperature gradient 362 exists along the y-direction. Without being limited by theory, due to the spin Seebeck effect there is a spin current $J_s$ parallel to the temperature gradient 362. With the adjacent SOT material 312, the inverse spin Hall effect may be utilized to detect spin current which is proportional to temperature gradient 362. When the FM material 302's magnetization is fixed in the z-direction, a spin polarization of spin current inside the SOT material 312 is in the same direction as the FM material 302 magnetization. The voltage is measured along the cross-track direction (x-direction) of the SOT material 312. The signal can be calculated using the following equation:

$$V_x = \left(\frac{w}{h}\right)\tanh\left(\frac{h}{2l_s}\right)\theta V_s \Delta T = \left(\frac{w}{h}\right)\theta\tanh\left(\frac{h}{2l_s}\right)S_{SS}\Delta T$$

In the above equation, w is the width 312x of the SOT material 312, h is the height 312y of the overhang portion of the SOT material 312a, $I_s$ is the spin diffusion length of the FM material 302, θ is the spin Hall angle of the SOT material 312, $S_{ss}$ is the spin Seebeck coefficient of the FM material 302 and is approximately 1 µV/K for magnetic materials, and ΔT is the difference in temperature along the y-direction of the FM material 302. When w is about 100 µm, h is about 100 nm, and the spin Hall angle is about 20, the signal is approximately 0.5 to 5 mv/K. The signal from the inverse spin Hall effect can be added to the signal from the anomalous Nernst effect (discussed above with FIGS. 3A and 3B) to create a larger signal.

The following discussion of materials is applicable to FIGS. 3A-3H.

In some embodiments, the heat sink 330 may be copper (Cu), aluminum (Al), silver (Ag), or any combination thereof.

In some embodiments, the FM material 302 may comprise one or more of cobalt (Co), iron (Fe), and one or more of boron (B), hafnium (Hf), and/or nickel hafnium (NiHf).

In some embodiments, the AFM material 301, may comprise iridium manganese (IrMn), platinum manganese (PtMn), or other antiferromagnetic materials.

In some embodiments, the insulating material, may comprise AlOx, SiNx, SiO2, MgO, HfOx, or other materials.

In some embodiments, the SOT material 312 may comprise BiSb. The BiSb may have a (001) or a (012) orientation.

In other embodiments, the SOT material 312 may comprise a topological insulator, a topological half-Heusler alloy, or a weakly oxidized heavy metal. The topological insulator may be Bismuth Selenide ($Bi_2Se_3$), Bismuth Telluride ($Bi_2T_3$) $Bi_2T_3$, Bismuth Antimony Telluride (($BiSb$)$_2Te_3$), or Tin Telluride (SnTe). The topological half-Heusler alloy may be Yttrium Platinum Bismuth (YPtBi), Lutetium Platinum Bismuth (LuPtBi), Lutetium Palladium Bismuth (LuPdBi), Scandium Platinum Bismuth (ScPtBi), Yttrium Gold Lead (YAuPb), Lanthanum Platinum Bismuth (LaPtBi), or Cerium Platinum Bismuth (CePtBi). The weakly oxidized heavy metal may be Tungsten oxides (WOx), Tantalum oxides (TaOx), or Platinum oxides (PtOx), wherein x is a number greater than zero.

Figure 4C:
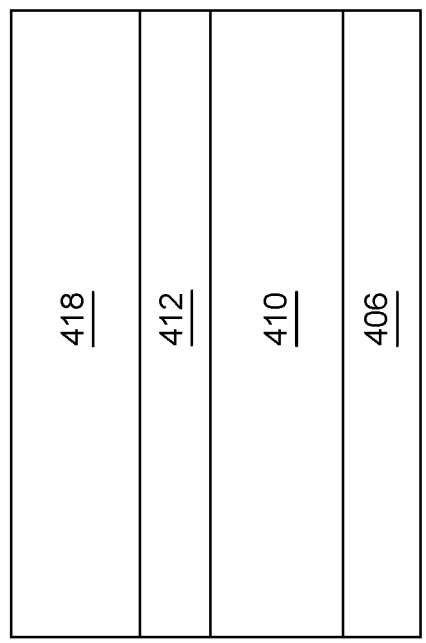
Figure 4C:
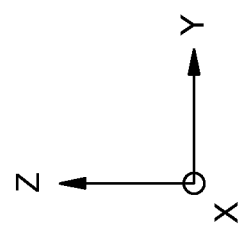

The SOT material 312 may comprise a single SOT material. In other embodiments, the SOT material 312 may comprise a stacked layer as shown in FIGS. 4A-4C. The stacked layers of the SOT material 312 of FIGS. 4A-4C may be used in combination with any of FIGS. 3A-3H.

The SOT material 312 of FIG. 4A comprises a seed layer 404, a buffer layer 406 disposed on the seed layer 404, an optional nucleation layer 408 disposed on the buffer layer 406, an SOT material sub-layer 410 disposed on the optional nucleation layer 408 (or the buffer layer 406), an interlayer 412 disposed on the SOT material sub-layer 410, a barrier layer 416 disposed on the interlayer 412, a cap layer 418 disposed on the barrier layer 416, and an electrode 402 disposed on the cap layer 418. While shown, the electrode 402 is optional.

The SOT material 312 of FIG. 4B is similar to the SOT material 312 of FIG. 4A; however, the SOT material 312 further comprises a texture layer 452 disposed between the seed layer 404 and the buffer layer 406, and the interlayer 412 is a multilayer structure comprising a first interlayer 454 disposed on the SOT material sub-layer 410 and a second interlayer 456 disposed on the first interlayer 454. As such, the SOT material 312 comprises the seed layer 404, the texture layer 452 disposed on the seed layer 404, the buffer layer 406 disposed on the texture layer 452, the optional nucleation layer 408 disposed on the buffer layer 406, the SOT material sub-layer 410 disposed on the optional nucleation layer 408 or the buffer layer 406, the first interlayer 454 disposed on the SOT material sub-layer 410, the second interlayer 456 disposed on the first interlayer 454, the barrier layer 416 disposed on the second interlayer 456, and the cap layer 418 disposed on the barrier layer 416. While not shown in FIG. 4B, the SOT material 312 may comprise one or more electrodes 402.

The SOT material 312 of FIG. 4C is similar to the SOT material 312 of FIGS. 4A-4B. The SOT material 312 of FIG. 4C comprises the buffer layer 406, the SOT material sub-layer 410 disposed on the buffer layer 406, the interlayer 412 disposed on the SOT material sub-layer 410, and the cap layer 418 disposed on the interlayer 412. While not shown in FIG. 4C, the SOT material 312 may comprise one or more electrodes 402, the seed layer 404, the texture layer 452, and/or the nucleation layer 408.

The SOT material sub-layer 410 may have a thickness in the z-direction of about 60 Å to about 200 Å. The SOT material sub-layer 410 may be referred to herein as a spin Hall effect (SHE) layer, a spin orbit torque (SOT) layer. The SOT material sub-layer 410 may comprise BiSb, a topological insulator, a topological half-Heusler alloy, or a weakly oxidized heavy metal. The topological insulator may be $Bi_2Se_3$, $Bi_2Te_3$, $(BiSb)_2Te_3$, or SnTe. The topological half-Heusler alloy may be YPtBi, LuPtBi, LuPdBi, ScPtBi, YAuPb, LaPtBi, or CePtBi. The weakly oxidized heavy metal may be WOx, TaOx, or PtOx, wherein x is a number greater than zero.

In embodiments where the SOT material 312 comprise one or more electrodes 402, the one or more electrodes 402 may each individually comprise a nonmagnetic, low resistivity metal. For example, the one or more electrodes 402 may each comprise Ru, CuAg, Ta(alpha), W(alpha), Mo, Cu, Ag, Rh, Pt, among others. Low to moderate resistivity magnetic materials can be used if the one or more electrodes 402 are far enough away not to interfere with FM/SOT interactions. The thickness of each of the one or more electrodes 402 in the z-direction is greater than or equal to about 100 Å.

The cap layer 418 may comprise nonmagnetic, high resistivity materials, such as: thin ceramic oxides or nitrides of TIN, SiN, and MgO; amorphous/nanocrystalline metals such as NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WReN, TaN, WN, TaOx, WOx, WB, HB, NiHfB, NiFeHfB, CoHfB, and CoFeHfB, where x is a numeral. The cap layer 418 can comprise multilayer combinations of the above-mentioned materials, and the overall thickness of the cap layer 418 in the y-direction is less than or equal to about 100 Å (nominally about 15 Å to about 50 Å). Furthermore, lower resistivity metals may be used in the cap layer 418 if the barrier layer 416 or the bottom portion of the cap layer 418 has a high resistivity and is thick enough to reduce FM shunting.

The seed layer 404 may comprise the same material(s) as the cap layer 418, and the seed layer 404 may be multilayered. For example, the seed layer 404 may comprise: nonmagnetic, high resistivity materials, such as thin ceramics of TIN, SiN, MgO, and $Al_2O_3$; amorphous/nanocrystalline metals such as NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WREN, TaN, WN, TaOx, WOx, WB, HfB, NiHfB, NiFeHfB, CoHfB, and CoFeHfB, where x is a numeral. The thickness of the seed layer 404 in the z-direction is less than or equal to about 100 Å (nominally about 15 Å to about 50 Å). The seed layer 404 and the cap layer 418 can each individually be thicker if magnetic electrodes are used in the device stack.

The texture layer 452 may comprise RuAl, where Ru is between about 45% to about 55%, CrMo, where Mo is between about 25% to about 50%, or multilayers of CrMoX with CrX, where X=Ti, Ru, Mo, or W. The texture layer 452 has a (001) texture. The texture layer 452 may have a B2 or BCC crystalline structure where the a-axis lattice parameter is about 2.95 Å to about 3.05 Å. The texture layer 452 has a thickness in the y-direction of about 30 Å to about 50 Å.

In some embodiments, each of the buffer layer 406, the interlayer 412, the barrier layer 416, and the nucleation layer 408 comprises magnetic or nonmagnetic Heusler alloys, where the Heusler alloys may be full Heusler alloys (i.e., $X_2YZ$) or half Heusler alloys (i.e., XYZ). Full $X_2YZ$ type Heusler alloys generally have L21, cF16, or C1b type structures with an a-axis between about 5.70 Å and about 6.20 Å, which perfectly matches to RuAl or CrMo texturing layer 452. Half XYZ type Heusler alloys generally have a B2 type or Pm-3m type structure with a-axis between about 2.85 Å to about 3.10 Å. However, the type or structure may vary with respect to both half and full Heusler alloys. For instance, RuMnAl, RhMnAl, and $Al_2CuRh$, have a Pm-3m structure, and $Ni_2MnAl$ and $Mn_2NiAl$ have cF16 structures while $Al_2NiMn$ has a B2 structure.

With both full and half Heusler alloys, X may be one of Li, Mg, Mn, Fe, Co, Ni, Cu, Ru, Rh, Pd, Ag, Cd, Ir, Pt, or Au; Y may be one of Li, Be, Sc, Ti, V, Cr, Mn, Fe, Co, Ni, Zn, Y, Zr, Nb, Mo, Hf, or W; and Z may be one of B, Mg, Al, Si, Zn, Ga, Ge, As, In, Sn, Sb, Pb, or Bi. Some nonmagnetic Heusler alloy examples include $Ti_2MnAl$, $Fe_2VAl$ (a-axis=5.78 Å), $Cr_2CoAl$ (a-axis=5.88 Å), CoTiSb (a-axis=5.88 Å), $Mn_2VSi$, $V_2VAl$ (a-axis=6.14 Å), $[Mn_{1-x}Co_x]_2VAl$ (x=0.5) (a-axis=6.05 Å), $[Mn_{1-x}Co_x]_2VSi$ (x=0.25) (a-axis=6.18 Å), and CoMnNbAl, CoZrFeAl. Magnetic Heusler alloy examples having large spin polarizations include $Co_2MnSb$ (a-axis=5.94 Å), $Co_2MnGe$ (a-axis=5.75 Å), CoMnSb (a-axis=5.90 Å) NiMnSb, $Co_2FeGe$, $Co_2MnSn$, and $Co_2MnFeGe$, each of which does not readily mix with the SOT material sub-layer 410.

Moreover, each of the buffer layer 406, the interlayer 412, the barrier layer 416, and the nucleation layer 408 comprises: (1) amorphous/nanocrystalline layers formed from Heusler alloys in combination with elements, or alloy layers that don't readily mix with the SOT or FM layers, or uniform alloys formed by co-sputtering Heusler alloys with other elements, or alloys which don't readily intermix with SOT or FM layer, or (2) polycrystalline Heusler alloys, which are epitaxial layers in the SOT material 312. With respect to amorphous/nanocrystalline buffer layers 406, nucleation layers 408, interlayers 412, and barrier layers 416, thin polycrystalline Heusler alloys (both magnetic and nonmagnetic, and full or half Heusler alloys) can be used when alloyed with other elements that don't readily mix with the SOT material sub-layer 410, such as Cu, Ag, Ge, Mn, Ni, Co Mo, W, Sn, B, and In, or in alloy combinations with one or more of aforementioned elements, such as CuAg, CuNi, CoCu, AgSn. The nucleation layer 408 can also be just very thin (e.g., dusting) layers of these aforementioned elements, or in very thin alloy combination of these elements like CuAg, CuNi, CoCu, and AgSn.

Utilizing amorphous or nanocrystalline layers formed from Heusler alloys alloyed with other elements that don't readily mix with the SOT material sub-layer 410 forms effectively nonmagnetic amorphous/nanocrystalline buffer and nucleation layers 406, 408 in several situations: (1) after deposition and room temperature (RT) intermixing; (2) post annealing prior to the SOT material sub-layer 410 deposition; (3) in single uniform composition layer nonmagnetic amorphous/nanocrystalline alloy depositions with single alloy targets; or (4) co-sputtered with targets which contain the elements of the Heusler alloy and the non-readily mixed multi-elemental combination of elements mentioned above.

The interlayer 412 and the barrier layer 416 are formed in a similar fashion as the buffer and nucleation layers 406, 408 (although the nucleation layer 408 can also be just these aforementioned elements or any nonmagnetic alloy combination of these elements); however, it is not necessary that after deposition and RT intermixing that the resulting graded interlayer 412 or barrier layer 416 be amorphous as long as the resulting layer has a high resistance and reduces interlayer 412/barrier layer 416 intermixing with the SOT material sub-layer 410.

With respect to polycrystalline Heusler alloys, thin layers of Heusler alloys, both magnetic and nonmagnetic, full or half Heusler alloys, can be used as the buffer layer 406, the interlayer 412, the barrier layer 416, and/or the nucleation layer 408 in (100) textured layer SOT devices (SOT orientation in this scenario is (012)). Heusler alloys generally have higher resistivities then the FM layer(s) 303, and transport spin currents or yield high spin polarization, while providing and maintaining (100) growth. Heusler alloys further have excellent lattice matching capabilities to MgO tunnel barrier layers and to bcc FM alloys. (100) texturing layers, such as the texture layer 452, can be used to establish the (100) texture, and non-magnetic Heusler $X_2YZ$ or XYZ having cF16 (C1b, L21) or B2 structures can be used to transmit the texture to the SOT material sub-layer 410, which in turn grows a strong (012) texture for the SOT material sub-layer 410.

Other non-Heusler, nonmagnetic materials that could be used for one or more of the epitaxial buffer layer 406, interlayer 412, and/or barrier layer 416 for epitaxial growth are: B2 or bcc materials, such as NiAl, RuAl, RhAl, $Mn_3Al$, V, Mo, W, TiW, CrX, where X=Ti, Ru, Mo, or W; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V.

In some embodiments, the barrier layer 416 can be formed from thin ceramic oxide or nitride layers like TiN, WN, SiN, and $Al_2O_3$, and MgO can be used as the barrier layer 416 or in combination with other high resistive nonmagnetic material layers. The top portion of a multilayer barrier layer 416 may also be comprise of high resistivity heavier metal amorphous or amorphous/nanocrystalline metals like NiFeTa, NiTa, NiHf, NiFeHf, CoHf, CoFeHf, NiWTa, NiFeW, NiW, and WRe; nanocrystalline metals like beta-Ta and beta-W; or nitrides, oxides, or borides of the aforementioned elements or alloys like NiTaN, NiFeTaN, NiWTaN, NiWN, WREN, TaN, WN, TaOx, WOx, TaBx, WBx, HfBx, NiHfB, NiFeHfB, and CoHfB, where x is a numeral. The bottom portion of the barrier layer 416 can be an amorphous/nanocrystalline material formed from Heusler alloys or other magnetic alloy materials when combined with aforementioned non-interacting elements or alloy combinations of those elements. Higher resistivity nonmagnetic alloys, such as CuAg, CuNi, NiAg, CoCu, NiAl, RuAl, RhAl, and AgSn, can also be used as the barrier layer 416. The barrier layer 416 can also be a polycrystalline nonmagnetic Heusler alloy or half Heusler alloy, or other B2 or bcc materials, such as NiAl, RuAl, RhAl, $Mn_3Al$, V, Mo, W, TiW, and CrX, where X=Ti, Ru, Mo, or W; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V; or in any combination of these material layers which has a higher resistive non-interacting layer next to the FM layer, among others.

When alloyed with nonmagnetic materials, examples of high resistive amorphous barrier layer 416 materials include Ge/CoFe/CuAg (as used here "/" denotes separate sub-layers in a stack or layer) (where Ge/CoFe may form a single layer at room temperature or may be deposited as an alloy layer, and where Ge has a thickness of about 6 Å, CoFe has a thickness of about 4 Å, and CuAg has a thickness of about 3 Å), CuAg/Ge/CoFe/CuAg (where CuAg/Ge/CoFe may form a single layer at room temperature or may be deposited as an alloy layer, and where CuGe has a thickness of about 3 Å, Ge has a thickness of about 5 Å, CoFe has a thickness of about 4 Å, and CuAg has a thickness of about 2 Å), or thin nonmagnetic alloy layers like CoFeGe, NiFeGe, CoFeGeAg, etc. (alloy composition for alloys with Ge should be greater than about 44 at. % Ge to render the alloy nonmagnetic). When alloyed with nonmagnetic materials, additional examples of elements, compounds, or crystalline/amorphous/nanocrystalline materials that may be utilized as the barrier layer include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å); Ge/CoFe/MgO (where Ge/CoFe may form a single layer at room temperature or may be deposited as an alloy layer, and where Ge has a thickness of about 6 Å, CoFe has a thickness of about 4 Å, and MgO has a thickness of about 3 Å); and MgO/Ge/CoFe (where Ge/CoFe may form a single layer at room temperature or may be deposited as an alloy layer, and where MgO has a thickness of about 3 Å, Ge has a thickness of about 6 Å, and CoFe has a thickness of about 4 Å). Examples of a barrier layer 416 or an interlayer 412 using alloys with $X_2YZ$ Heusler alloys would be Ge/$Co_2FeGe$ (which may form a single layer at room temperature or may be deposited as an alloy layer, and where Ge is about 4 Å thick and $Co_2FeGe$ is about 5 Å thick); or using alloys with XYZ half Heusler alloys like Ge/CoFeGe (which may form a single layer at room temperature or may be deposited as an alloy layer, where Ge is about 3 Å thick and CoFeGe is about 6Å Å thick); and Ge/CoA (which may form a single layer at room temperature or may be deposited as an alloy layer), Ge/FeA (which may form a single layer at room temperature or may be deposited as an alloy layer), or Ge/NiA (which may form a single layer at room temperature or may be deposited as an alloy layer), where A can be one or more elements belonging to full Heusler alloys $X_2YZ$ or half Heusler alloys XYZ; or used in combination with very thin (i.e., dusting layers about 1 Å to about 5 Å thick) of nonmagnetic seed or capping layers of alloys of CuAg, NiCr, CoCu, AgSn, etc., such as Ge/$X_2YZ$/CuAg, Ge/$X_2YZ$/CuNi, CuNi/Ge/$X_2YZ$, or CuAg/Ge/$X_2YZ$/CuNi. The alloy composition should be nonmagnetic as in the case of alloys with one of the aforementioned non-interacting elements or alloys of these elements like Ge where Ge exceeds about 44 at. % to render the alloy nonmagnetic.

The barrier layer 416 may comprise multilayer stacks comprising one or more of the aforementioned elements, compounds, or crystalline/amorphous/nanocrystalline metals. The thickness in the z-direction of the barrier layer 416 may be about 3 Å to about 100 Å, depending on resistivity of the barrier layer 416, and how effective the barrier layer 416 is at reducing FM intermixing and FM shunting in the SOT material 312.

The interlayer 412 may comprise any of the aforementioned elements, compounds, or crystalline/amorphous/nanocrystalline metals that the barrier layer 416 may comprise. Additionally, the interlayer 412 may comprise nonmagnetic alloy or multilayer stack containing one or more of the following elements Cu, Ag, Ge, Mn, Ni, Co, Mo, W, In, B, and Sn; or in conjunction with magnetic alloys such as CoA, FeA, and NiA, where A can be one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; where Y is selected from the group consisting of: Ti, V, Cr, Mn, Fe, Co, Ni, Zn, Y, Zr, Nb, Mo, Hf and W; and where Z is selected from the group consisting of: B, Al, Si, Ga, Ge, As, In, Sn, Sb, and Bi. The magnetic alloys or Heusler alloys should combine with other layers, combinations of elements, or other alloys to form a nonmagnetic layer or multilayer stack after room temperature deposition and intermixing, or deposited as a nonmagnetic single layer alloy, or in combinations thereof. The overall total thickness of the interlayer 412 is less than about 20 Å, such as about 3 Å to about 15 Å. Nonmagnetic polycrystalline Heusler alloys may also be used for the interlayer 412, such as $V_2VAl$ or $[Mn_{0.5}Co_{0.5}]_2VAl$, etc.

The interlayer 412 should have higher resistivity and be nonmagnetic. Thin, high resistivity, low Z ceramic oxide and nitride layers of TiN, SiN, $Al_2O_3$, MgO, thin layers can be used in the interlayer 412. Furthermore, other materials that may be used as the interlayer 412 if not disposed in direct contact with the SOT material sub-layer 410 include: high resistivity, heavier metal amorphous/nanocrystalline metals such as NiFeTa, NiTa, NiWTa, NiFeW, NiW, and WRe; nanocrystalline metals like beta-Ta or beta-W; or nitrides, oxides, or borides of the aforementioned elements or alloys such as NiTaN, NiFeTaN, NiWTaN, NiWN, WReN, TaN, WN, TaOx, WOx, TaBx, WBx, and HfBx. Higher resistivity, nonmagnetic alloys which don't readily interact with the SOT material sub-layer 410, such as Cu, Ag, Ge, Mn, Ni, Co, Mo, W, Sn, B, In, and multi-element alloys combinations thereof, like CuAg, CuNi, NiAg, CoCu, NiAl, RuAl, RhAl, CuCo, and AgSn.

Examples of high resistive, amorphous materials for the interlayer 412 include Ge (6 Å)/CoFe (4 Å)/CuAg (3 Å) (which may form a single layer at room temperature or may be deposited as an alloy layer), CuAg (3 Å)/Ge (5 Å)/CoFe (3 Å)/CuAg (2 Å) (which may form a single layer at room temperature or may be deposited as an alloy layer), or single alloy nonmagnetic layers of CoFeGe, NiFeGe, CoFeGeAg, among others. The interlayer 412 may comprise thin multilayer stacks consisting of the aforementioned elements, compounds, or crystalline/amorphous/nanocrystalline layers as long as the overall multilayer stack is nonmagnetic and has a high resistivity.

Magnetic alloys and magnetic Heusler alloys can be used if used in combinations with other elements or alloys above such that when deposited, the materials intermix at room temperature, or after post annealing, to form a nonmagnetic stack. Examples include layers of NiFeX, CoFex, Nix, FeX, CoX, where X is an element that does not readily interact with BiSb, such as Cu, Ag, Ge, Mn, Ni, Co, Mo, W, Sn, B, and In, or magnetic Heusler alloys deposited on non-interacting element or alloy layers like Ge layers and in single alloy deposition layers where the resulting Ge content in the intermixed alloy renders it nonmagnetic (e.g., in the case of alloying with Ge the Ge content should be greater than or equal to about 44 at. %); or in combination with sufficiently thick layers of elements which do not readily interact with BiSb, such as Cu, Ag, Ge, Mn, Ni, Co, Mo, W, Sn, B, and In, to form multi-element, nonmagnetic, high resistivity combinations thereof; or single polycrystalline nonmagnetic Heusler layers.

Another example of materials that may be used for the interlayer 412 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å).

Moreover, materials similar to the interlayer 412 can be used in the barrier layer 416, such as Cu, Ag, Ge, Mn, Ni, Co Mo, W, Sn, B, In, and alloy combinations thereof, when used in alloy combinations with Ge to form graded nonmagnetic layers, such as NiFeGe, CoFeGe, CoCu, NiCu, and CuAg alloys, or Heusler alloy combinations mixed with Ge, where the Ge content is about greater than or equal to about 44 atomic percent (at. %). The Ge content being about greater than or equal to about 44 at. % ensures even magnetic Heusler alloys are nonmagnetic when intermixed with Ge, or deposited as a single alloy with Ge>44%, or in combination with other non-mixing elements (i.e., Cu, Ag, Mn, Mo, Ni, W, In, B, and Sn) such that the final thin multilayer interlayer 412 and/or barrier layer 416 after deposition mixing or post annealing is nonmagnetic.

In the SOT material 312 of FIG. 4B, the first interlayer 454 may comprise any nonmagnetic material listed above, such as a polycrystalline nonmagnetic Heusler alloy, or high resistivity fcc oxide layer like a thin MgO tunnel barrier. The second interlayer 456 may comprise a magnetic material, such as polycrystalline magnetic Heusler alloys. Magnetic Heusler examples have large spin polarizations, and examples of magnetic Heusler alloys that can be used in the second interlayer 456 include $Co_2MnSb$, $Co_2MnGe$, CoMnSb, NiMnSb, $Co_2FeGe$, $Co_2MnSn$, and $Co_2MnFeGe$, which do not readily mix with the SOT material sub-layer 410. In the SOT material 312 of FIG. 4B, a thickness of the first interlayer 454 and the second interlayer 456 in the z-direction is collectively between about 5 Å to about 20 Å.

The nucleation layer 408 may comprise any of the same materials as the barrier layer 416 and/or interlayer 412; or a nanocrystalline to polycrystalline epitaxial layer like a nonmagnetic Heusler alloy; or bcc or B2 non-interacting material with the SOT. Additionally, the nucleation layer 408 may comprise elements which do not readily interact with the SOT material sub-layer 410, such as Cu, Ag, Ge, Mn, Co, Ni, Mo, Sn, In, B, and W; or in multiple element alloy combinations thereof, such as CuAg, CuNi, CuCo, and AgSn; or low Fe alloys thereof, or one or more of these elements or combination of elements. Further examples of materials that may be used as dusting layers of the nucleation layer 408 include Ge having a thickness between about 2 Å to about 6 Å, CuAg having a thickness between about 2 Å to about 5 Å, and CuNi having a thickness between about 2 Å to about 5 Å. The nucleation layer 408 may have a thickness in the y-direction of about 1 Å to about 10 Å.

The buffer layer 406 may comprise any of the same materials as the barrier layer 416 and/or interlayer 412. The buffer layer 406 may further comprise any of the above-listed materials used in the interlayer 412, such as a single alloy layer or layer combinations; nonmagnetic alloys or multilayer stacks comprising one or more of the following elements Cu, Ag, Ge, Mn, Ni, Mo, and W; or multi-element alloy combinations thereof; or in conjunction with magnetic and or nonmagnetic alloys such as CoA, FeA, NiA, where A is one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; Y is selected from the group consisting of: Ti, V, Cr, Mn, Fe, Co, Ni, Zn, Y, Zr, Nb, Mo, Hf, and W; and Z is selected from the group consisting of: B, Al, Si, Ga, Ge, As, In, Sn, Sb, and Bi. The magnetic alloy or Heusler alloys should combine with other elements such as Cu, Ag, Ge, Mn, Co, Ni, Mo, Sn, In, B, and W, or combine in multi-elemental alloy layers thereof, to form a nonmagnetic total stack buffer layer 406. The buffer layer 406 may be thin or relatively thick, such as having a thickness in the z-direction of about 5 Å to about 100 Å. A thicker buffer layer 406 can provide better migration resistance against elements from neighboring stacks getting into the SOT material sub-layer 410, or provide better migration resistance of the individual elements within the SOT material sub-layer 410 out of the SOT material sub-layer 410. The buffer layer 406 can be made thicker by lamination of layers to better control SOT nucleation/growth and texture.

Additional examples of materials that can be used for the buffer layer 406 include: $[Ge/X_2YZ]*n$ laminations, $[Ge/XYZ]*n$ laminations, and $[Ge/XYZ]*n$ laminations, where n is a whole numeral; Ge-enriched $X_2YZ$ and Ge-enriched XYZ single layer alloys such that the buffer layer 406 is nonmagnetic (i.e., Ge>44%); [Ge (6 Å)/$Co_2$(MnFe)Ge (4 Å)]*4, [Ge (3 Å)/CoFeGe (6 Å)]*3, and [Ge (6 Å)/NiFe (4 Å)]*n; and with Ge alloyed or layered with NiA, FeA, CoA in lamination, where A is one or more elements belonging to full Heusler alloys $X_2YZ$ or half Heusler alloys XYZ, for example, [Ge (6 Å)/NiA (4 Å)]*n] where 1<n<4. The overall buffer layer 406 has a thickness between about 10 Å to about 50 Å.

In the SOT material 312, the SOT material sub-layer 410 is deposited on the buffer layer 406 or the nucleation layer 408. As the SOT material sub-layer 410 is deposited, the SOT material sub-layer 410 may be doped or remain undoped. When the SOT material sub-layer 410 is undoped, the buffer layer 406 (or the nucleation layer 408) promotes the SOT material sub-layer 410 to grow a (001) crystal orientation. When the SOT material sub-layer 410 is doped, the buffer layer 406 (or the nucleation layer 408) promotes the SOT material sub-layer 410 to grow a (012) crystal orientation. The relatively non-interacting dopant used to promote the (012) orientation of the SOT material may be, a gas, a metal, a non-metal, or a ceramic material. To create a strong (012) texture, the entire SOT material sub-layer 410 need not be doped, only about the first 10 Å to about 50 Å of the SOT material sub-layer 410 immediately adjacent to the buffer layer 406 (or the nucleation layer 408) needs to be doped. The remaining SOT material sub-layer 410 may then be deposited as undoped SOT material on top of the initially doped portion of SOT material already deposited. Doping only a portion of the SOT material sub-layer 410 is sufficient to promote and grow a (012) orientation of the entire SOT material sub-layer 410. The SOT material 312 can achieve a spin Hall angle (SHA) of about 2 or larger when the SOT material sub-layer 410 has a (012) orientation or a (001) orientation.

With respect to each of the SOT material 312 of FIGS. 4A-4C, in some embodiments, each of the buffer layer 406, the barrier layer 416, and/or interlayer 412 may be a single alloy layer. In other embodiments, each of the buffer layer 406, the barrier layer 416, and/or interlayer 412 may be used as a thicker layer constructed of laminated repeated bilayers. The thicker laminated bilayer aids in controlling (001) or (012) textured SOT material growth and reduces diffusion or migration through the buffer layer 406, the barrier layer 416, and/or interlayer 412.

The buffer layer 406 and the nucleation layer 408 not only provide a strong (001) or (012) texture, the buffer layer 406 and the nucleation layer 408 also prohibit or minimize the migration of the individual elements of the SOT material sub-layer 410 from diffusing into or through the buffer layer 406 and the nucleation layer 408. Because the buffer layer 406, the nucleation layer 408, and/or the interlayer 412 has high resistivity (e.g., about 300 µohm-cm), shunting of the SOT material sub-layer 410 is minimized, which improves signal output.

By having an FM material abutting a MFS, the anomalous Nernst effect can be employed to measure a temperature gradient. When a SOT material abuts the FM material and is recessed from the MFS, the inverse spin Hall effect may be employed in addition to the anomalous Nernst effect to measure the temperature gradient. Providing a heat sink increases the thermal gradient, which also increases the output voltage, making it easier to detect the temperature gradient.

In one embodiment, a temperature detection device, comprising a ferromagnetic (FM) material disposed at a media facing surface (MFS). The FM material is configured to produce a first electric voltage signal in response to a temperature gradient due to an anomalous Nernst effect. The temperature detection device also comprises a spin-orbit torque (SOT) material abutting the FM material. The SOT material comprises at least one of BiSb, a topological insulator, a topological half-Heusler alloy, or a weakly oxidized heavy metal. The SOT material is recessed from the MFS. The SOT material is configured to receive a spin current parallel to the temperature gradient generated by a spin Seebeck effect in the FM material, the spin current being detectable as a second electric voltage signal via an inverse spin Hall effect. The first electric voltage signal is added to the second electric voltage signal.

In another embodiment, the temperature detection device, wherein the SOT material has a width in a cross-track direction, a height, and a thickness. The width of the SOT material is greater than the height of the SOT material.

In yet another embodiment, the temperature detection device, wherein the FM material has a width in the cross-track direction, a height, and a thickness. The width of the FM material is greater than the height of the FM material.

In another embodiment, the temperature detection device, wherein the SOT material comprises BiSb.

In another embodiment, the temperature detection device of claim 1, wherein the FM material comprises at least one of cobalt, iron, nickel, boron, hafnium, or nickel hafnium.

In yet another embodiment, the temperature detection device, wherein: the topological insulator is $Bi_2Se_3$, $Bi_2T_3$, $(BiSb)_2Te_3$, or SnTe; the topological half-Heusler alloy is YPtBi, LuPtBi, LuPdBi, ScPtBi, YAuPb, LaPtBi, or CePtBi; and the weakly oxidized heavy metal is WOx, TaOx, or PtOx, wherein x is a number greater than zero.

In another embodiment, the temperature detection device, wherein a first portion of the SOT material is stacked on the FM material, and a second portion of the SOT material is adjacent to the FM material.

In another embodiment, a magnetic recording head comprising the temperature detection device.

In yet another embodiment, the magnetic recording head, further comprising a read head, wherein the temperature detection device is disposed adjacent to the read head.

In another embodiment, a magnetic recording device comprising the magnetic recording head.

In one embodiment, a magnetic recording head comprising a read head and a temperature detection device disposed adjacent to the read head. The temperature detection device comprising a ferromagnetic (FM) material disposed at a media facing surface (MFS). The FM material has a magnetization direction parallel to the MFS. A temperature gradient of the FM material is perpendicular to the MFS, wherein the FM material is configured to generate an electric voltage signal in response to a temperature gradient due to an anomalous Nernst effect.

In another embodiment, the magnetic recording head, wherein the temperature detection device further comprises an antiferromagnetic (AFM) material disposed adjacent to the FM material.

In yet another embodiment, the magnetic recording head, wherein the temperature detection device is configured to read a voltage across the FM material.

In another embodiment, the magnetic recording head, wherein the temperature detection device further comprises a heat sink, wherein the heat sink is recessed from the MFS.

In another embodiment, the magnetic recording head, wherein the FM material has a width, a height, and a thickness, wherein the width of the FM material is greater than the height of the FM material.

In another embodiment, magnetic recording head, wherein the FM material has a width, a height, and a thickness, wherein the width of the FM material is greater than the thickness of the FM material.

In another embodiment, a magnetic recording device, comprising the magnetic recording head.

In one embodiment, a temperature detection device, comprising a ferromagnetic (FM) material disposed at a media facing surface (MFS). The FM material has a magnetization direction parallel to the MFS. The temperature detection device further comprises a spin-orbit torque (SOT) material. The SOT material portion abuts the FM material and is recessed from the MFS.

In another embodiment, the temperature detection device, wherein the SOT material comprises a body portion and an overhang portion, wherein the overhang portion is stacked on the FM material, and the body portion abuts the FM material.

In yet another embodiment, the temperature detection device, wherein the FM material is configured to produce a first electric voltage signal in response to a temperature gradient due to an anomalous Nernst effect. The SOT material is configured to receive a spin current parallel to the temperature gradient via a spin Seebeck effect from FM materials, the spin current being detectable as a second electric voltage signal via the inverse spin Hall effect. The first electric voltage signal is added to the second electric voltage signal.

In another embodiment, the temperature detection device, wherein the SOT material comprises a seed layer, a buffer layer disposed on the seed layer, a nucleation layer disposed on the buffer layer, a SOT material sub-layer disposed on the nucleation layer, an interlayer disposed on the SOT material sub-layer, a barrier layer disposed on the interlayer, a cap layer disposed on the barrier layer, and an electrode disposed on the cap layer.

In yet another embodiment, the temperature detection device, wherein the SOT material comprises a seed layer, a texture layer disposed on the seed layer, a buffer layer disposed on the texture layer, a nucleation layer disposed on the buffer layer, a SOT material sub-layer disposed on the nucleation layer, a first interlayer disposed on the SOT material sub-layer, a second interlayer disposed on the first interlayer, a barrier layer disposed on the second interlayer, and a cap layer disposed on the barrier layer.

In another embodiment, the temperature detection device, wherein the SOT material comprises a seed layer, a texture layer disposed on the seed layer, a buffer layer disposed on the texture layer, a SOT material sub-layer disposed on the buffer layer, an interlayer disposed on the SOT material sub-layer, and a cap layer disposed on the interlayer.

In another embodiment, a magnetic recording head comprising the temperature detection device.

In yet another embodiment, the magnetic recording head, further comprising a read head disposed adjacent to the temperature detection device.

In another embodiment, a magnetic recording device, comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head comprising:
 a temperature detection device, comprising:
  a ferromagnetic (FM) material configured to produce a first electric voltage signal in response to a temperature gradient due to an anomalous Nernst effect the FM material being disposed at a media facing surface (MFS);
  a spin-orbit torque (SOT) material abutting the FM material, the SOT material comprising at least one of bismuth antimony (BiSb), a topological insulator, a topological half-Heusler alloy, or a weakly oxidized heavy metal, wherein the SOT material is configured to receive a spin current parallel to the temperature gradient generated by a spin Seebeck effect in the FM material, the spin current being detectable as a second electric voltage signal via an inverse spin Hall effect, wherein the FM material has a magnetization direction parallel to the MFS, wherein the temperature gradient of the FM material is perpendicular to the MFS, and wherein the SOT material is entirely recessed from the MFS in order to receive the spin current; and
 circuitry configured to add the first electric voltage signal to the second electric voltage signal.

2. The magnetic recording head of claim 1, wherein the SOT material comprises BiSb.

3. The magnetic recording head of claim 1, wherein the FM material comprises at least one of cobalt, iron, nickel, boron, hafnium, or nickel hafnium.

4. The magnetic recording head of claim 1, wherein:
the topological insulator is Bismuth Selenide ($Bi_2Se_3$), Bismuth Telluride ($Bi_2T_3$), Bismuth Antimony Telluride ($(BiSb)_2Te_3$), or Tin Telluride (SnTe);
the topological half-Heusler alloy is Yttrium Platinum Bismuth (YPtBi), Lutetium Platinum Bismuth (LuPtBi), Lutetium Palladium Bismuth (LuPdBi), Scandium Platinum Bismuth (ScPtBi), Yttrium Gold Lead (YAuPb), Lanthanum Platinum Bismuth (LaPtBi), or Cerium Platinum Bismuth (CePtBi); and
the weakly oxidized heavy metal is Tungsten oxides (WOx), Tantalum oxides (TaOx), or Platinum oxides (PtOx), wherein x is a number greater than zero.

5. The magnetic recording head of claim 1, wherein a first portion of the SOT material is stacked on the FM material, and a second portion of the SOT material is adjacent to the FM material.

6. The magnetic recording head of claim 1, wherein the SOT material has a width in a cross-track direction, a height from the MFS, and a thickness, wherein the width of the SOT material is greater than the height of the SOT material.

7. The magnetic recording head of claim 6, wherein the FM material has a width in the cross-track direction, a height from the MFS, and a thickness, wherein the width of the FM material is greater than the height of the FM material.

8. The magnetic recording head of claim 1, further comprising a read head, wherein the temperature detection device is disposed adjacent to the read head.

9. A magnetic recording device comprising the magnetic recording head of claim 1.

10. A magnetic recording head comprising:
a temperature detection device, comprising:
a ferromagnetic (FM) material configured to produce a first electric voltage signal in response to a temperature gradient due to an anomalous Nernst effect, the FM material being disposed at a media facing surface (MFS);
a spin-orbit torque (SOT) material abutting the FM material, the SOT material comprising at least one of bismuth antimony (BiSb), a topological insulator, a topological half-Heusler alloy, or a weakly oxidized heavy metal, wherein the SOT material is configured to receive a spin current parallel to the temperature gradient generated by a spin Seebeck effect in the FM material, the spin current being detectable as a second electric voltage signal via an inverse spin Hall effect, and wherein the SOT material is entirely recessed from the MFS in order to receive the spin current, the SOT material being recessed a distance of 50 nm (nanometer) to 1 μm (micrometer) from the MFS; and
circuitry configured to add the first electric voltage signal to the second electric voltage signal.

11. The magnetic recording head of claim 10, wherein the SOT material overlaps the FM material up to about 5 nm to about 10 nm.

12. The magnetic recording head of claim 10, wherein the SOT material is spaced from the FM material.

13. The magnetic recording head of claim 10, wherein the FM material comprises at least one of cobalt, iron, nickel, boron, hafnium, or nickel hafnium.

14. The magnetic recording head of claim 10, wherein:
the topological insulator is Bismuth Selenide ($Bi_2Se_3$), Bismuth Telluride ($Bi_2T_3$), Bismuth Antimony Telluride ($(BiSb)_2Te_3$), or Tin Telluride (SnTe);
the topological half-Heusler alloy is Yttrium Platinum Bismuth (YPtBi), Lutetium Platinum Bismuth (LuPtBi), Lutetium Palladium Bismuth (LuPdBi), Scandium Platinum Bismuth (ScPtBi), Yttrium Gold Lead (YAuPb), Lanthanum Platinum Bismuth (LaPtBi), or Cerium Platinum Bismuth (CePtBi); and
the weakly oxidized heavy metal is Tungsten oxides (WOx), Tantalum oxides (TaOx), or Platinum oxides (PtOx), wherein x is a number greater than zero.

15. The magnetic recording head of claim 10, wherein the SOT material has a width in a cross-track direction, a height from the MFS, and a thickness, wherein the width of the SOT material is greater than the height of the SOT material.

16. The magnetic recording head of claim 15, wherein the FM material has a width in the cross-track direction, a height from the MFS, and a thickness, wherein the width of the FM material is greater than the height of the FM material.

17. The magnetic recording head of claim 10, further comprising a read head, wherein the temperature detection device is disposed adjacent to the read head.

18. A magnetic recording device comprising the magnetic recording head of claim 10.

19. A magnetic recording head comprising:
a temperature detection device, comprising:
a ferromagnetic (FM) material configured to produce a first electric voltage signal in response to a temperature gradient due to an anomalous Nernst effect, the FM material being disposed at a media facing surface (MFS);
a stacked spin-orbit torque (SOT) material abutting the FM material, the SOT material comprising at least one of bismuth antimony (BiSb), a topological insulator, a topological half-Heusler alloy, or a weakly oxidized heavy metal, wherein the stacked SOT material comprises two or more layers, wherein the SOT material is configured to receive a spin current parallel to the temperature gradient generated by a spin Seebeck effect in the FM material, the spin current being detectable as a second electric voltage signal via an inverse spin Hall effect, and wherein the SOT material is entirely recessed from the MFS in order to receive the spin current, the SOT material being recessed a distance of 50 nm (nanometer) to 1 μm (micrometer) from the MFS; and
circuitry configured to add the first electric voltage signal to the second electric voltage signal.

20. The magnetic recording head of claim 19, wherein the FM material comprises at least one of cobalt, iron, nickel, boron, hafnium, or nickel hafnium.

21. The magnetic recording head of claim 19, wherein:
the topological insulator is Bismuth Selenide ($Bi_2Se_3$), Bismuth Telluride ($Bi_2T_3$), Bismuth Antimony Telluride ($(BiSb)_2Te_3$), or Tin Telluride (SnTe);
the topological half-Heusler alloy is Yttrium Platinum Bismuth (YPtBi), Lutetium Platinum Bismuth (LuPtBi), Lutetium Palladium Bismuth (LuPdBi), Scandium Platinum Bismuth (ScPtBi), Yttrium Gold Lead (YAuPb), Lanthanum Platinum Bismuth (LaPtBi), or Cerium Platinum Bismuth (CePtBi); and
the weakly oxidized heavy metal is Tungsten oxides (WOx), Tantalum oxides (TaOx), or Platinum oxides (PtOx), wherein x is a number greater than zero.

22. The magnetic recording head of claim 19, wherein the SOT material has a width in a cross-track direction, a height from the MFS, and a thickness, wherein the width of the SOT material is greater than the height of the SOT material.

23. The magnetic recording head of claim 22, wherein the FM material has a width in the cross-track direction, a height from the MFS, and a thickness, wherein the width of the FM material is greater than the height of the FM material.

24. The magnetic recording head of claim 19, further comprising a read head, wherein the temperature detection device is disposed adjacent to the read head.

25. A magnetic recording device comprising the magnetic recording head of claim 19.

\* \* \* \* \*